United States Patent [19]

Sasaoka et al.

[11] Patent Number: 5,329,600
[45] Date of Patent: Jul. 12, 1994

[54] REFLECTION MONITOR OPTICAL FIBER COUPLER MANUFACTURING SYSTEM AND METHOD

[75] Inventors: Eisuke Sasaoka; Masumi Fukuma; Hiroaki Takimoto; Hiroshi Suganuma; Hiroshi Yokota; Junichi Yoshikawa, all of Kanagawa; Kazuhiko Arimoto, Tokyo, all of Japan

[73] Assignees: Sumitomo Electric Industries, Ltd., Osaka; Sumiden Opcom, Ltd., Tokyo, both of Japan

[21] Appl. No.: 892,208

[22] Filed: Jun. 2, 1992

[30] Foreign Application Priority Data

Jun. 3, 1991 [JP] Japan .................. 3-130213
Jul. 30, 1991 [JP] Japan .................. 3-212950
Jul. 30, 1991 [JP] Japan .................. 3-212951
Aug. 2, 1991 [JP] Japan .................. 3-194521
Aug. 2, 1991 [JP] Japan .................. 3-194524

[51] Int. Cl.$^5$ ............................................. G02B 6/26
[52] U.S. Cl. ............................... 385/43; 250/227.24; 356/73.1; 385/15
[58] Field of Search .............. 356/73.1; 250/227.11, 250/227.14–227.19, 227.24; 385/39, 42, 43, 46, 47, 48, 15, 44, 45

[56] References Cited

U.S. PATENT DOCUMENTS

| | | | |
|---|---|---|---|
| 4,330,170 | 5/1982 | Johnson et al. | 385/43 |
| 4,392,712 | 7/1983 | Ozeki | 385/43 |
| 4,685,799 | 8/1987 | Brininstool | 356/73.1 |
| 4,756,589 | 7/1988 | Bricheno et al. | 385/39 |
| 4,763,272 | 8/1988 | McLandrich | 364/468 |
| 4,810,052 | 3/1989 | Fling | 385/44 |
| 4,822,128 | 4/1989 | Imoto et al. | 385/43 |
| 4,834,481 | 5/1989 | Lawson et al. | 385/42 X |
| 5,011,252 | 4/1991 | Thorncraft et al. | 385/43 |
| 5,187,362 | 2/1993 | Keeble | 250/227.15 |

FOREIGN PATENT DOCUMENTS

| | | |
|---|---|---|
| 0238134 | 3/1987 | European Pat. Off. . |
| 0225737 | 6/1987 | European Pat. Off. . |
| 0423437 | 7/1990 | European Pat. Off. . |
| 60-039526 | 3/1985 | Japan . |
| 62-280818 | 12/1987 | Japan . |
| 2020809 | 1/1990 | Japan . |
| 3136008 | 6/1991 | Japan . |

OTHER PUBLICATIONS

Newton, "A New Technique in o.t.d.r.", Electronics & Wireless World, vol. 94, No. 1627, May 1988, pp. 496–500.

Horiguchu et al., Optical Reflectometer Using Low Coherence Source, Transations of the Institute of Electronics, Information and Communication Engineers of Japan, Apr. 1988, pp. 348–349.

Takai et al., Time-Average Readout of Speckle Photographs by Laser Illumination from a Vibrating Optical Fiber, Journal of the Optical Society of America Optics and Image Science, Aug. 1986, pp. 1305–1310.

*Primary Examiner*—John D. Lee
*Attorney, Agent, or Firm*—Cushman, Darby & Cushman

[57] ABSTRACT

In an optical fiber coupler fabricating process where couplers are successively formed by heating, elongating and cutting a plurality of long optical fibers, light is led into the first end of the fiber, reflected at the second end of the coupler, and the reflected light is monitored by photodetectors. In this manner, an exact splitting ratio can be obtained. Techniques for minimizing measuring errors caused by the inter-reflected-light interference, the inter-Rayleigh-scattering-light interference, and the interference between the reflected light and the Rayleigh scattering light, while exploiting the advantageous feature of the reflection monitor method that the fiber connection work for each fiber coupler fabrication is not required are disclosed.

106 Claims, 16 Drawing Sheets

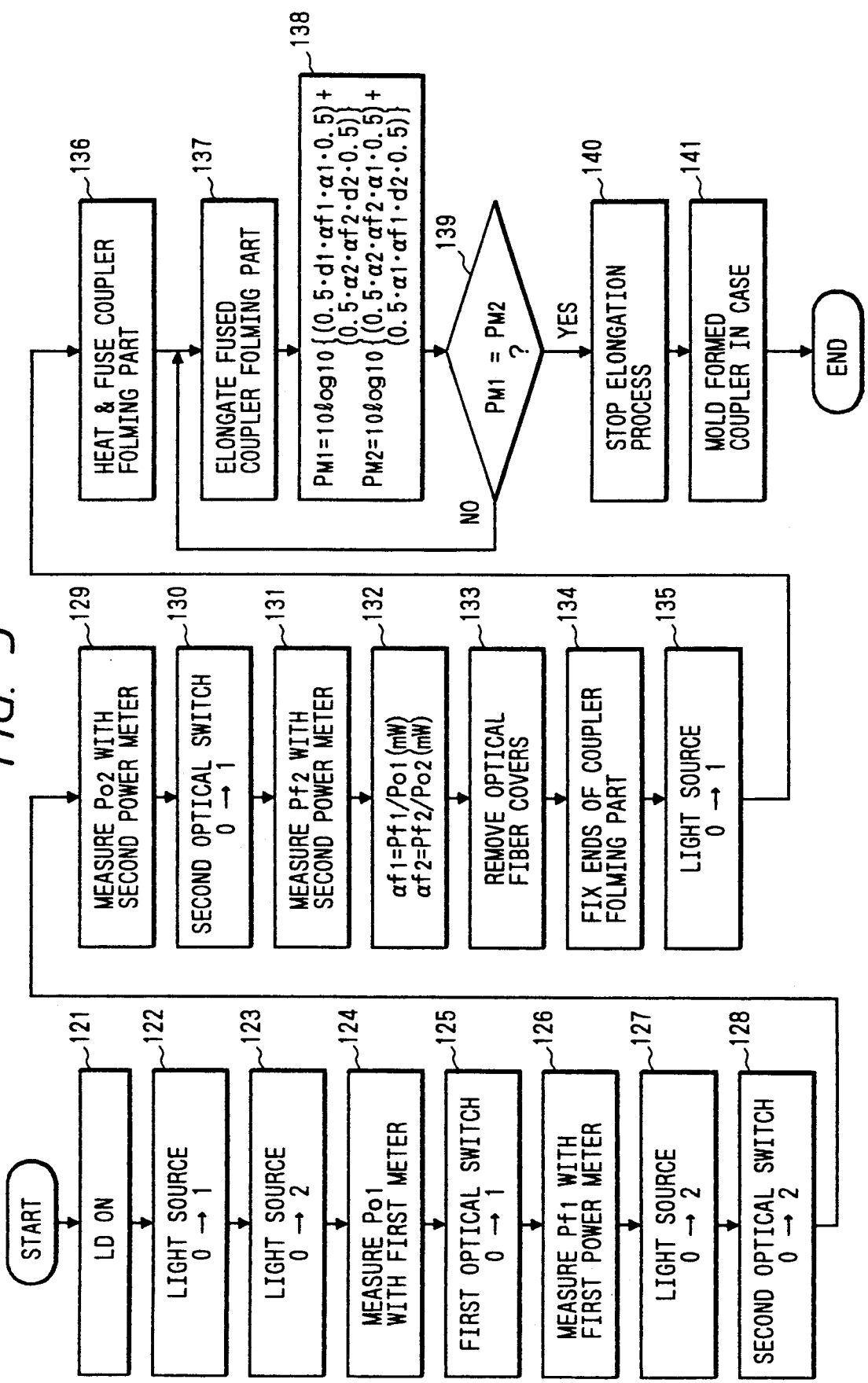

FIG. 18

| MON. METH. | INPUT TO PHOTODET. 506a | INPUT TO PHOTODET. 506b |
|---|---|---|
| CONVENTIONAL | -37.6~-38.6dBm | -34.3~-35.4dBm |
| INVENTION | -38.0dBm | -35.0dBm |

FIG. 23

| MON. METH. | INPUT TO PHOTODET. 606a | INPUT TO PHOTODET. 606b |
|---|---|---|
| CONVENTIONAL | -37.6~-38.6dBm | -34.3~-35.4dBm |
| INVENTION | -38.0dBm | -35.0dBm |

REFLECTION MONITOR OPTICAL FIBER COUPLER MANUFACTURING SYSTEM AND METHOD

BACKGROUND OF THE INVENTION

1. Field of Invention

The present invention relates to a method of fabricating optical fiber couplers by a fusion-elongation method for fabricating couplers by heating, fusing and elongating the parts of the gathered optical fibers.

2. Description of Prior Art

The optical fiber coupler is a device for splitting and coupling light passing through a plurality of optical fibers. The coupler is fabricated by heating, fusing and elongating the parts of the gathered optical fibers. To fabricate optical fiber couplers having a desired splitting ratio, the splitting ratio must be monitored in the fusion-elongation process.

The fusion-elongation method for fabricating the optical fiber couplers will be described in brief. The coatings of the parts of short optical fibers are removed. The coating-removed or exposed parts are brought together, heated, fused by a burner, for example, and elongated. One end of the optical fiber is connected to a light source (a semiconductor laser), while the other end is connected to photodetectors (optoelectric transducing elements). Light from the light source is introduced into the optical fiber at the first end thereof. Light emanating from the second end is monitored by the photodetectors. When a specific splitting ratio is reached, the operation of heating and elongating the exposed part is stopped (Japanese Patent Laid-Open Publication No. Sho. 63-175812).

A transmission monitor method has been known as one of the methods for monitoring the splitting ratio. FIG. 28 is an explanatory diagram showing an outline of the transmission monitor method. In the figure, reference numeral 1b designates a light source; 2a and 2b, optical fibers wound around bobbins; 3, an optical fiber coupler under fabrication; 6a and 6b, photodetectors; 7, a computer for computing splitting ratios; and 8a and 8b, V-grooves for fiber connection.

The light source 1b is a laser diode for generating laser light having the wavelength normally used. The coating-removed parts of the combined optical fibers 2a and 2b supplied from the bobbins for coupler fabrication purposes form an optical fiber coupler 3 under fabrication; that is, being subjected to the fusion-elongation process. The optical fibers are respectively connected at the ends to the optical fibers connecting to the photodetectors 6a and 6b at the V-grooves 8a and 8b. Laser light emitted from the light source 1b is led to the optical fiber 2a, passes through the coupler 3 under fabrication, and enters the photodetectors 6a and 6b. The light incident on the photodetectors 6a and 6b depends on the splitting conditions of the coupler 3 under fabrication. Accordingly, if the detected values are input to the computer 7, the computer may compute a splitting ratio. When a desired splitting ratio is reached, if the elongating operation is stopped, an optical fiber coupler having the desired splitting ratio can be fabricated.

In the transmission monitor method, at least one of the optical fibers coupled with the light source and the photodetector must be reconnected at the end every time one optical fiber coupler is formed. More specifically, in the case of FIG. 28, every time one coupler is formed, the coupler 3 is removed and a new coupler 3 is connected to the optical fibers of the photodetectors 6a and 6b at the fiber connection V-grooves 8a and 8b. The connection work is time consuming work, and if the connection is improper, measurement errors will be increased.

SUMMARY OF INVENTION

To solve the above-mentioned problems, the reflection monitor method has been proposed by the inventor. In this method, light is incident on the first end of an optical fiber to be used for fabricating an optical fiber coupler and is reflected at the second end of the fiber. The reflected light is detected by a photodetector located on the incident end of the fiber. A splitting ratio is obtained on the basis of the detected value. FIG. 29 is an explanatory diagram showing an outline of the reflection monitor method. In the figure, reference numeral 1b designates a light source; 2a and 2b, optical fibers wound around bobbins; 3, an optical fiber coupler under fabrication; 4, an optical fiber coupler for measurement; 5a and 5b, refractive index matching oil for preventing reflection; 6a and 6b, photodetectors; and 7, a computer for computing splitting ratios.

The light source 1b, as in the case of FIG. 28, is a laser diode for generating laser light having the wavelength normally used. The coating-removed parts of the combined optical fibers 2a and 2b supplied from the bobbins for coupler fabrication purposes form an optical fiber coupler 3 under fabrication; that is, being subjected to the fusion-elongation process. One of the first ends of the optical fibers is used as a reflection end, while the other is immersed in refractive index matching oil 5b for preventing reflection, and serves as a nonreflection end. Laser light emitted from the light source 1b is led through the coupler 4 to the optical fiber 2a, passes through the coupler 3 under fabrication, and is transmitted to the distal ends of the fibers. The light power transmitted to the reflection ends are partially reflected to propagate in the reversed direction. The reflected light power passes through the coupler 3 under fabrication. Part of the reflected light passes through the fiber 2a and the coupler 4 and reaches the photodetector 6a. The remaining part of the reflected light passes through fiber 2b and reaches the photodetector 6b. The light entering the photodetectors 6a and 6b, as in the case of FIG. 28, depends on the splitting conditions of the coupler 3 under fabrication. Accordingly, if the detected values by the photodetectors 6a and 6b are computed by the computer 7, a desired splitting ratio can be attained.

The construction of the reflection monitor method described with reference to FIG. 29 is a possible construction of the present invention. Other constructions of the reflection monitor method will be described with reference to FIGS. 16 and 17. In those figures, similar reference numerals are used for designating like or equivalent portions in FIG. 29.

In the construction of FIG. 16, an optical fiber coupler for measurement is additionally inserted in the route including the optical fiber 502b. Optical fiber couplers 506a and 506b having the same characteristics are inserted in the photodetectors 506a and 506b, respectively, so that the reflected light power can be measured at the same gains.

In the construction of FIG. 17, optical switches 509a, 509b and 509c are additionally used. Laser light from the light source 501 is selectively guided to the fiber 502a or the fiber 502b by operating the switch 509a. The reflected light power or the incident light power to the optical fiber coupler 503 may be selectively measured by operating the switches 509b and 509c.

The refractive index matching oil 505b, which receives the distal end of the optical fiber, is not essential and may be omitted. Although two optical fibers are used for forming the optical fiber coupler, three or more optical fibers may be used for the same purposes.

The reflection monitor method is advantageous in that the light source and the photodetectors may be connected to only one end of the optical fiber coupler, and that since the bobbin-wound optical fibers are used, there is no need of connecting the fibers every time the coupler is fabricated.

In the reflection monitor method, when the reflected light are returned from the ends of a plurality of optical fibers, the light are coupled by the optical fiber coupler. In this case, the reflected light interfere with each other, so that the reflected light power will vary. Rayleigh scattering light from the bobbin-wound optical fibers used for forming the coupler interfere with each other or Rayleigh scattering light and the reflected light interfere with each other, so that the received light power will vary. The variation of the received light power may cause measurement errors in the reflection monitor method.

The present invention also has an object of providing a method of manufacturing optical fiber couplers which can eliminate the measuring errors caused by inter-reflected-light interference, inter-Rayleigh-scattering-light interference, and interference between reflected light and Rayleigh scattering light while exploiting the advantageous feature of the reflection monitor method that fiber connection work for each fiber coupler fabrication is not required.

In the transmission monitor fabricating method, every time the optical fiber coupler is formed, it must be cut out, so that either of the light source or one of the photodetectors must be connected again. The connection work takes much time and requires a high skill. Improper connection, if so done, will lead to measurement errors.

The reflection monitor fabricating method is free from the connection problem, which is the inevitable for the transmission monitor method. In the reflection monitor method, the reflected light from the open end of the optical fiber, which is to be detected, is weak Fresnel reflection light. Therefore, in a case where the fiber is long, the detected reflected light is noticeably affected by Rayleigh scattering within the optical fibers. This will cause measuring errors.

Accordingly, an first object of the present invention is to provide a method of fabricating fiber type couplers which can simplify the connection work of the light source and the photodetectors in the coupler fabricating process.

To achieve the above first object, a first embodiment of the invention provides a method of fabricating fiber type couplers in which, when a coupler is formed by fusing and elongating a coupler forming part of a plurality of optical fibers, light passing through the coupler forming part is detected, and the process of elongating the coupler forming part is stopped on the basis of the detected light, the method comprising: a first step for entering a prescribed quantity of light at least one of the plurality of optical fibers from one of the first end of the optical fiber; a second step in which when the incident light passes through the coupler forming part, is reflected at the second end of the optical fiber, and returns through the coupler forming part toward the first end thereof, the reflected light is detected at the first end of one of the optical fibers; and a third step for controlling the stop of the elongating process on the basis of a ratio of the quantities of the detected light. A second embodiment of the invention provides a method of fabricating fiber type couplers in which, when a coupler is formed by fusing and elongating a coupler forming part of a plurality of optical fibers, light passing through the coupler forming part is detected, and the process of elongating the coupler forming part is stopped on the basis of the detected light, the method comprising: a first step for entering a prescribed quantity of light at least one of the plurality of optical fibers from one of the first end of the optical fiber; a second step in which when the incident light passes through the coupler forming part, is reflected at the second end of the optical fiber, and returns through the coupler forming part toward the first end thereof, the reflected light is detected at the first ends of at least two optical fibers; and a third step for controlling the stop of the elongating process on the basis of a ratio of the quantities of the detected light.

In those fabricating methods, the optical fibers are preferably long, and the light source and the photodetectors are preferably provided on the first end side of the optical fibers, and the coupler forming part is provided on the second end side of the optical fibers.

As discussed above, light is incident on the first end of the optical fiber, passes through the coupler forming part and is reflected at the second end and returns to the light incident end of the optical fiber through the coupler forming part. The reflected light is detected at the first end of the optical fiber. With the construction, the light incidence and the reflected light detection can be performed at only one end of the optical fiber, although in the conventional coupler fabricating method, light is incident on the first end of the optical fiber, while it is detected at the second end.

In the construction, the optical fibers are long, and the light source and the photodetectors are provided on the first end side of the optical fibers, and the coupler forming part is provided on the second end side of the optical fiber. If in the process for fabricating the first coupler, the light source and the photodetectors are provided on the first end side of the optical fibers, the second and subsequent couplers can be fabricated without any additional connection work of the light source and the photodetectors.

According to the first embodiment of the present invention, the entering of the light to be detected into the optical fibers and the detection of the return light from the fibers may be performed on only one side of the fibers. With provision of the light source and the photodetectors on one side of the fibers, the current elongation of the coupler under fabrication may be monitored, and the combination of the light source and the photodetectors may be connected to the first end of the optical fibers. This leads to improvement of the connection work efficiency.

Also according to the second embodiment of the present invention, in the fabricating process of the second and subsequent couplers, without any additional connecting work to connect the light source and the photodetectors to the optical fibers, and those couplers may be successively fabricated on the second end side of the fibers. Accordingly, total time taken for fabricating all the couplers is reduced.

A second object of the present invention is to remove the measurement error caused by the interference of the reflected light by exploiting such an advantageous feature of the reflection monitor method that the connection work carried out every time a coupler is formed is not required. FIG. 8 is a diagrammatic view for explaining the reflection monitor method according to a third embodiment of the present invention. Long single mode fibers 304 and 304' are wound around bobbins, respectively. The first end of the fiber 304 is connected through a splitting coupler 302 to a light source 301, while the second end is connected through a coupler 305 to a reflection device 308, usually formed by cutting the fiber end flat. The first end of the split fiber of the branch 302 is connected to a photodetector 306, while the second end is coupled with a reflection preventing device 303. The optical fiber 304' is connected at the first end to an photodetector 306', and at the second end to a reflection preventing device 303' by way of a coupler 305.

Light emitted from the light source 301 passes through the splitting coupler 302 and the coupler 305, and is reflected by the reflection device 308. The reflected light is led to the photodetectors 306 and 306' constructed with optoelectric transducing elements, which measure the quantities of the reflected light. The light quantities are supplied to a computer 307 which computes a splitting ratio. The computed ratio is used for controlling the apparatus for fabricating the coupler 305.

A specific means of implementing the third embodiment of the present invention, as will be given below, is a method for fabricating optical fiber couplers comprising: a first step in which when a plurality of optical fibers are fused and elongated till a desired splitting ratio is reached, a prescribed quantity of light is led into a first end of at least one optical fiber; a second step in which the light led is reflected at a second end of the optical fiber and returns to pass again through said coupler, the return light is detected at the first end of the optical fiber; and a third step for controlling the elongation of the coupler for stop on the basis of a ratio of the quantity of the detected light and the quantity of the incident light, wherein a reflection preventing device is provided on the distal end side of at least one of the plurality of optical fibers 304 and 304' or the reflection preventing devices 303 and 303' are provided on the distal end side of all of other optical fibers than the fiber to which light has been led.

The reflection preventing device may be realized by immersing the distal end of the optical fiber in light absorbing material, for example, black ink or refractive index matching oil, for example, silicon oil, by bending the distal end of the optical fiber, thereby causing bending loss, or obliquely cutting or polishing the distal end of the optical fiber.

A more specific means of implementing the third embodiment of the present invention is such that in the fabricating method, long optical fibers are used, a light source and photodetectors are provided on the first end side of the optical fibers, and a coupler forming part is formed on the second end side of the fibers.

In the fabricating method of the third embodiment of the present invention shown in FIG. 8, the Fresnel reflection at the distal end of the fiber 304' wound around the bobbin is prevented by means, for example, of immersing the distal end in refractive index matching oil. The Fresnel reflection is caused by only the reflection device 308 located at the distal end of the fiber 304. Therefore, no interference of the reflected light occurs and the measurement values by the photodetectors 306 and 306' are invariable. The reflection preventing means 303 is also provided on the distal end side of the coupler 302, so that the measurement value by the photodetector 306 is also stable.

As described above, the optical fiber coupler fabricating method of the present invention can eliminate the interference of the Fresnel reflected light causing the measurement error, which is a disadvantage of the reflection monitor method, while exploiting its advantage that the connection work performed every coupler formation is not required. Accordingly, the method can improve the efficiency of fabricating the optical fiber couplers and the accuracy of measuring the splitting ratio.

A third object of the present invention is to provide a method of fabricating optical fiber couplers which minimizes the effect by the Rayleigh scattering light in monitoring the splitting ratio.

Light is led into the optical fiber from an incident end of the fiber, and is reflected at the distal end to return to the incident end. The return light contains Fresnel reflection light from the distal end of the fiber and Rayleigh scattering light present over the entire optical fiber. A power Pr of the Fresnel reflection light is given by $$Pr = Po \cdot \alpha^2 \cdot r$$

where
r = Fresnel reflectivity,
α = transmittance of the optical fiber (the emitted light power when transmitted divided by the incident light power when transmitted), and
Po = incident light power.

The above formula teaches that when the optical fiber is long and the transmittance of the fiber becomes small, the Fresnel reflection light power becomes extremely small. As shown in FIG. 13, the Rayleigh scattering light power becomes large when the length of the fiber becomes large. For this reason, where long optical fibers are used, the effect by the Rayleigh scattering light is great. From this fact, it is seen that if only the Rayleigh scattering light power may be measured within the optical fiber, only the Fresnel reflection light power of the reflection light power, which contain both the powers, can be calculated.

According to the principle described above, before the coupler forming part is heated and fused, the quantity of Rayleigh scattering light in the optical fiber is detected at the first end of the optical fiber. The Rayleigh scattering light caused in the optical fiber can be obtained in the form of numerical value. Then, after the coupler forming part is heated and fused, a fixed quantity of light is led into the optical fiber from the first end thereof, and a quantity of the reflected light is detected at the first ends of a plurality of optical fibers. By subtracting the detected value of the Rayleigh scattering light from the detected values of the reflected light, the quantity of only the Fresnel reflection light in the coupler under fabrication can be obtained. Calculation of the splitting ratio of the optical fiber coupler on the basis of the quantity of the Fresnel reflection light thus obtained will provide an exact splitting ratio.

As seen from the foregoing description, in a fourth embodiment of the present invention, the Rayleigh scattering light caused in the optical fiber is previously detected. In monitoring the splitting ratio of the coupler when the coupler forming part is elongated, the detected value of the reflected light is corrected using the detected value of the Rayleigh scattering light. Accordingly, the influence by the Rayleigh scattering light can be minimized, and the optical fiber couplers fabricated have the desired splitting ratio.

A fourth object of the present invention is to provide a method of manufacturing optical fiber couplers which can eliminate measuring errors caused by inter-reflected-light interference, inter-Rayleigh-scattering-light interference and interference between the reflected light and Rayleigh scattering light while exploiting the advantageous feature of the reflection monitor method that the fiber connection work for each fiber coupler fabrication is not required.

To achieve the above fourth object of the present invention, there is provided a method for fabricating optical fiber couplers in which, when an optical fiber coupler is formed by heating and fusing, and elongating a plurality of optical fibers, light is led into one optical fiber from the first end thereof, passes through a coupler forming part, and is reflected at the second end of the optical fiber, and at this time the reflected light is detected at the first end of the optical fiber, and the elongating operation is controlled on the basis of the detected value, wherein the light incident on the first end of the optical fiber is low coherency light.

To exactly calculate the splitting ratio, it is necessary to exactly measure the Fresnel reflection light returned from the distal end of the bobbin-wound fiber 502a or 502b, which is detected by the photodetector 506a or 506b shown in FIGS. 15 to 17. If the light source used is of a high coherence type, the Fresnel reflection light are returned from both the fibers 502a and 502b and coupled in the optical fiber coupler 503 under fabrication, the light interfere with each other. Further, the Rayleigh scattering light from the bobbin-wound optical fibers interfere with each other, and the Rayleigh scattering light and the Fresnel reflection light also interfere with each other. As the result of the interference, the received light power at the photodetectors 506a and 506b vary, causing measurement errors.

In a fifth embodiment of the present invention, by using a low coherence light source, the interference of the Fresnel reflection light and Rayleigh scattering light is prevented so that no variation of the received light power takes place at the photodetectors 506a and 506b.

A fifth object of the present invention is to eliminate the adverse influence by the interference of Fresnel reflection light and Rayleigh scattering light which will cause measurement errors in the reflection monitor method while at the same time exploiting the advantageous features of the reflection monitor method. Accordingly, the coupler fabricating method of the invention can improve the efficiency of fabricating optical fiber couplers and the measurement accuracy of the splitting ratios.

To achieve the above fifth object of the present invention, there is provided another method for fabricating optical fiber couplers in which, when a coupler is formed by heating, fusing, and elongating a coupler forming part of a plurality of optical fibers, a quantity of light passing through the coupler forming part is detected and the stop of the process of elongating the coupler forming part is controlled on the basis of the quantity of the detected light, the method comprising: a first step in which before the coupler forming part is heated and fused, a fixed quantity of light is led into at least one optical fiber from the first end thereof, and the quantity of Rayleigh scattering light in the optical fiber is detected at the first end of the optical fiber; a second step in which while the coupler forming part is heated and fused, a fixed quantity of light is led into the optical fiber from the first end thereof, is made to pass through the coupler forming part, is reflected at the second end of the optical fiber, is made to pass again through the coupler forming part, and a quantity of reflected light is detected at the first ends of a plurality of optical fibers; and a third step in which a quantity of light detected in the first step and a quantity of each light detected in the second step are corrected, and the stop of the process of elongating the coupler forming part is controlled on the basis of the ratios of the corrected quantities of light.

In the method, the detection of the Rayleigh scattering light is carried out, preferably suppressing the Fresnel reflection at the second end of the optical fiber. Further, the Fresnel reflection is suppressed at the second end of the optical fiber, preferably by immersing the second end of the optical fiber in refractive index matching material.

To achieve the above fifth object, in a sixth embodiment of the present invention, there is provided a method for fabricating optical fiber couplers in which, when an optical fiber coupler is formed by heating, fusing, and elongating a plurality of optical fibers, light is introduced into one optical fiber from the first end thereof, passes through a coupler forming part, and is reflected at the second end of the optical fiber, and at this time the reflected light is detected at the first end of the optical fiber, and the elongating operation is controlled on the basis of the detected value, wherein the variations of the received light power owing to interference by Fresnel reflection light and Rayleigh scattering light are forced and averaged with respect to time so that light is received stably.

In this embodiment, the variations of the received light powers owing to the interferences by the Fresnel reflection light and the Rayleigh scattering light are forcibly caused by varying at least one of the phase, polarization, and frequency of light propagating through the optical fiber and the optical fiber coupler.

To exactly calculate the splitting ratio, it is necessary to exactly measure the Fresnel reflection light returned from the distal end of the bobbin-wound fiber 602a or 602b which is detected by the photodetector 606a or 606b shown in FIGS. 19 to 21. If the light source used is of a high coherence type, the Fresnel reflection light is returned from both the fibers 602a and 602b and coupled in the optical fiber coupler 603 under fabrication, the light will interfere. Further, the Rayleigh scattering light from the bobbin-wound optical fibers will interfere, and the Rayleigh scattering light and the Fresnel reflection light will also interfere. As the result of the interference, the received light power at the photodetectors 606a and 606b vary, causing measuring errors.

In this embodiment, at least one of the phase, polarization, and frequency of the Fresnel reflection light and the Rayleigh scattering light, which will cause the interference, is varied, thereby forcibly giving rise to the light power variation owing to Fresnel reflection light and Rayleigh scattering light. For example, if the polarization and the phase of the Fresnel reflection light and the Rayleigh scattering light are varied at high speed by a polarization/phase modulator, the interference light power also varies at high speed. When the varying speed of the interference light power is satisfactorily high relative to the averaging time of the photodetectors 606a and 606b, the received light power of each photodetector 606a and 606b is averaged and takes a stable value. As a result, even if the interference of Fresnel reflection light and the Rayleigh scattering light takes place, the received light powers of the photodetectors 606a and 606b do not vary.

As seen from the foregoing description, the coupler fabricating method of the invention succeeds in eliminating the adverse influence by the interferences of Fresnel reflection light and Rayleigh scattering light which will cause measurement errors in the reflection monitor method while at the same time exploiting the advantageous features of the reflection monitor method. Accordingly, the coupler fabricating method of the invention can improve the efficiency of fabricating the optical fiber couplers and the measurement accuracy of the splitting ratios.

A sixth object of the present invention is to provide a method of fabricating optical fiber couplers which can minimize the influence of the Rayleigh scattering while the monitoring of the splitting ratio is conducted.

When pulse light is led into a long optical fiber, Rayleigh scattering is caused over the entire optical fiber. Therefore, Rayleigh scattering light returning to the incident end of the fiber (detected as reflected light) takes a time-dependent waveform as shown in FIG. 27. When pulse light is repetitively entered into the fiber and the pulse generating interval is gradually reduced, Rayleigh scattering light of the plurality of light pulses overlaps and the time-dependence property gradually disappears. Meanwhile, Fresnel reflection takes place only at the second or distal end of the fiber. Accordingly, if pulse light is repetitively incident on the fiber, the Fresnel reflection light returns to the incident end while keeping the original waveform which is the same as the waveform of the incident light. Therefore, if modulated light of a short pulse generating interval, i.e., modulated with a high modulating frequency is used, Rayleigh scattering light is detected as light of a fixed power having no time-dependency and Fresnel reflection light is detected as a modulated-light power having the original waveform.

To achieve the above sixth object, there is provided a method for fabricating optical fiber couplers in which, when a coupler is formed by heating, fusing and elongating a coupler forming part of a plurality of optical fibers, a quantity of light passing through said coupler forming part is detected and the stop of the process of elongating said coupler forming part is controlled on the basis of the quantity of the detected light, said method comprising:

a first step of leading a predetermined quantity of modulated light into at least one of the plurality of optical fibers from the first end thereof;

a second step in which when the modulated light passes through said coupler forming part, is reflected at the second end of said optical fiber, and passes again through said coupler forming part, the reflected light is detected at the first end of one of the plurality of optical fibers; and a third step for controlling the stop of the process of elongating the coupler forming part on the basis of the ratio of a quantity of the detected, reflected light and a quantity of the incident modulated light.

In this method, the detection of reflected light is preferably carried out in synchronism with the incident modulated light. The reflected light is preferably amplified before detected. Further, a lock-in amplifier is preferably used for the amplification.

Modulated light enters an optical fiber from the first end thereof and a modulated wave which is synchronized with the reflected light from the second end of the fiber is detected at the first end. Thus, entering of light and detection of the same can be carried out at only the first end of the fiber. Further, modulated light is used for measurement and the modulated light is detected so that the light reflected by Fresnel reflection and Rayleigh scattering light can be discriminately detected.

If the reflected light is detected in synchronism with the incident modulated light, Fresnel reflection light can be selected for detection. In this case, if the detected modulated light is amplified, only Fresnel reflection light to be measured can be amplified, so that the influence by Rayleigh scattering is minimized.

As seen from the foregoing description, in a seventh embodiment of the present invention, modulated light is led to an optical fiber forming an optical fiber coupler from the first end thereof and the light reflected at the second end is detected. The stop of the elongating operation of the coupler forming part is controlled on the basis of the ratio of a quantity of the detected light and a quantity of the incident modulated light. Therefore, the work for connecting the optical fibers and the monitor devices is simplified. Fresnel reflection light and Rayleigh scattering light may be discriminately detected. If only Fresnel reflection light is selected and detected, the influence of Rayleigh scattering light can be substantially reduced. The optical fiber couplers thus fabricated have the desired splitting ratio.

BRIEF DESCRIPTION OF DRAWINGS

FIG. 5 is a flowchart showing a flow of a coupler fabricating process.

FIG. 18 is a table comparatively showing the results of measuring the received light powers in the conventional reflection monitor measuring system and the reflection monitor measuring system of the present invention.

FIG. 23 is a table comparatively showing the results of measuring the received light powers in the conventional reflection monitor measuring system and the reflection monitor measuring system of the present invention.

DESCRIPTION OF PREFERRED EMBODIMENTS

Figure 1:
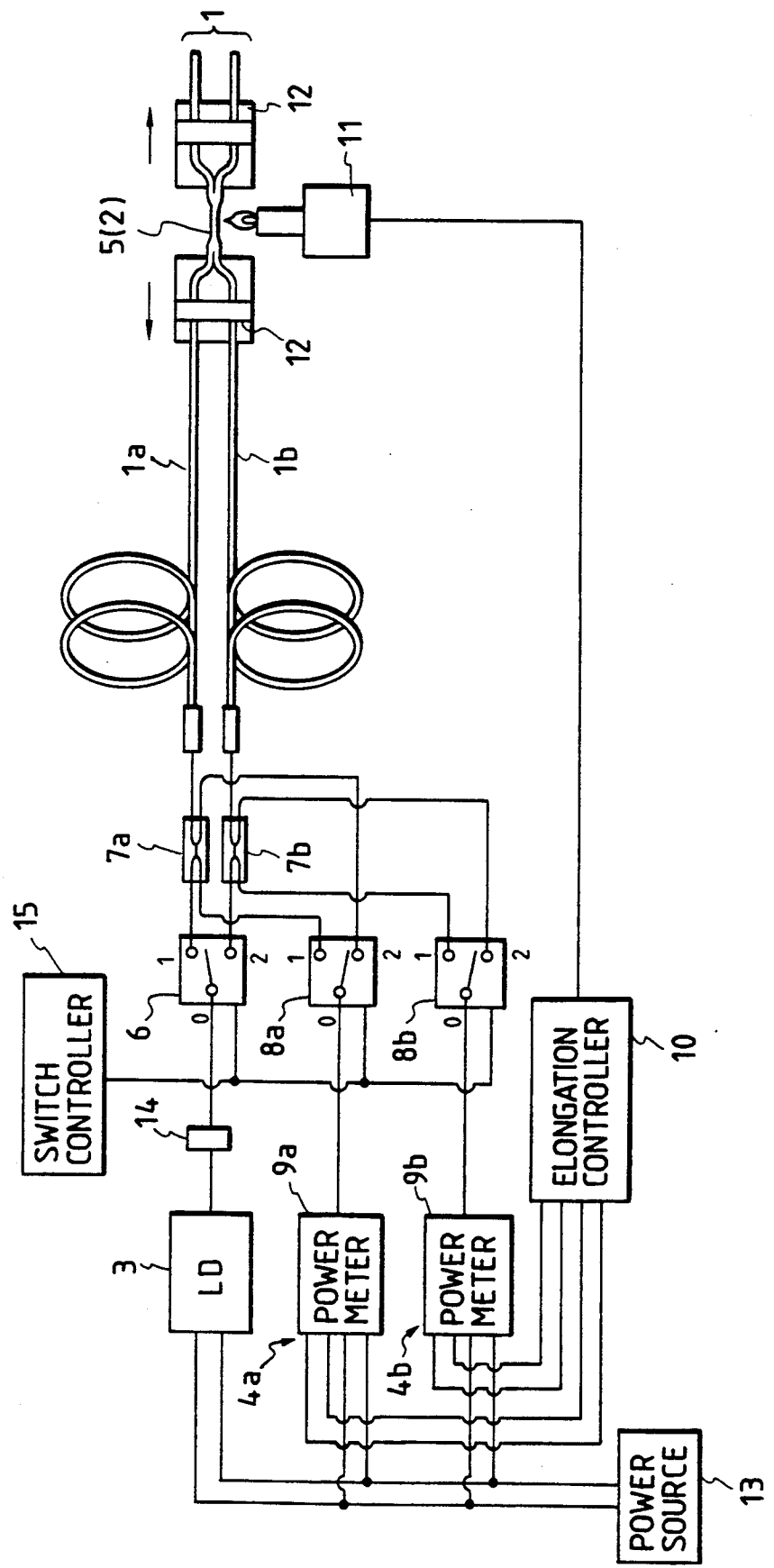
FIG. 1 is a block and schematic diagram showing the construction of a fiber type coupler fabricating apparatus for executing a method of fabricating fiber type couplers according to the present invention.

An apparatus of fabricating fiber type couplers to execute a method of fabricating fiber type couplers according to first and second embodiments of the present invention will first be described with reference to FIG. 1.

A couple of long optical fibers 1 are set to the apparatus. The apparatus progressively fabricates a number of fiber type couplers 2 having the splitting ratio of 1:1.

A semiconductor laser device 3 as a light source, a first photodetector 4a coupled with a first optical fiber 1a and a second photodetector 4b coupled with a second optical fiber 1b are provided on the first end side of the optical fibers 1. A coupler forming part 5 as the parts of the gathered optical fibers 1a and 1b where the coatings are removed is formed on the second end side of the optical fibers 1.

The semiconductor laser device 3 is connected through an optical switch 6 for light source to both the optical fibers 1a and 1b. The detected light is selectively guided to the first optical fiber 1a or the second optical fiber 1b through the switching operation of the optical switch 6.

The first photodetector 4a is made up of a first split coupler 7a provided between one end of the first optical fiber 1a and the optical switch 6, a first optical switch 8a coupled with the first split coupler 7a, and a first power meter 9a. The second photodetector 4b is made up of a second split coupler 7b provided between one end of the second optical fiber 1b and the optical switch 6, a second optical switch 8b coupled with the second split coupler 7b, and a second power meter 9b. The split couplers 7a and 7b split incident light from the laser device 3 and the reflected light from the second ends of the optical fibers 1a and 1b. The split light is guided to the power meters 9a and 9b containing photodetectors. In turn, the power meters each detect the quantity of the reflected light. The first and second split couplers 7a and 7b are of the fiber type and have a splitting ratio of 1:1. The incident light and the reflected light from the optical fibers 1a and 1b are guided to the power meters 9a and 9b by selectively operating the switches 8a and 8b.

Detected signals derived from the power meters 9a and 9b are applied to an elongation controller 10 where splitting ratios are calculated. The calculated splitting ratios are used for controlling the operations of a heater 11 for heating the coupler 2 and elongating tables 12 and 12.

The principles of the coupler fabricating method of the invention will be described in detail. A total loss of light in the optical system of the coupler fabricating apparatus, when allowing for Fresnel reflection, can be obtained using the following formula (see FIG. 2):

$$a_f = 2P_f/P_0 = 2P_f/P_0'$$

where

Po=power (unit: mw) of the light that is emitted from the laser device 3 and incident on the first end of the optical fiber 1, Pf=power of the light Fresnel reflected by and returned from the second end of the optical fiber 1, $P_0'$=incident power split by the split coupler 7 and guided to the power meter 9, and Pf'=Reflected power split by the split coupler 7 and guided to the power meter 9.

In the formula, the incident light power Po' and the reflected light power Pf' are obtained through measurement. Accordingly, a quantity of reflected light can be obtained which is used as a reference value when the current elongation of the split coupler 7 will be monitored in connection with $P_0'$.

Figure 2:
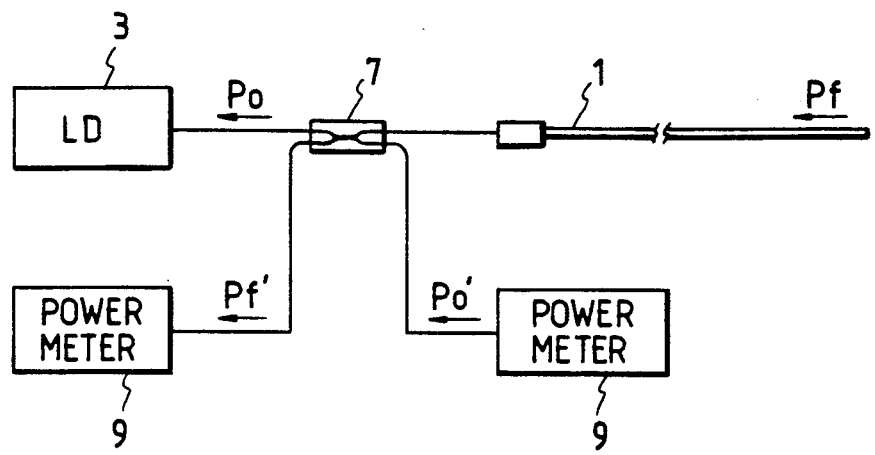
FIGS. 2 and 3 are explanatory diagrams for explaining the principles of the fabricating method of the present invention.
Figure 3:
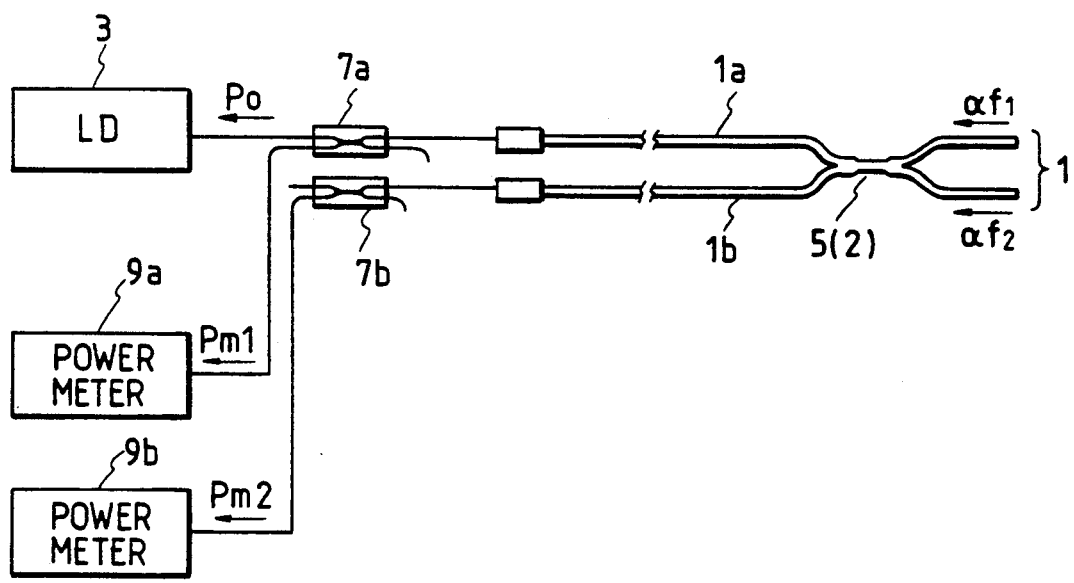

Consider variations of figures indicated by the power meters 9a and 9b when the coupler 2 is fabricated while monitoring the reflecting light with reference to FIG. 2. A power attenuation ratio $a_1$ for the same fibers by the coupler forming part 5 and a power attenuation ratio $\alpha 2$ for different fibers are given by $$\alpha_1 = P_1''/P_0''$$

$$\alpha_2 = P_2''/P_0''$$

where $P_0''$ indicates an incident or input power of the first fiber 1a located preceding to the coupler forming part 5, and $P_1''$ and $P_2''$ indicate respectively the output powers of the first and second optical fibers 1a and 1b succeeding to the coupler forming part. The powers $\alpha_{f1}$ and $\alpha_{f2}$, which are reflected at the second ends of the first and second fibers 1a and 1b, are split by the first and second split couplers 7a and 7b and guided to the power meters 9a and 9b. The reflected powers $P_{M1}$ and $P_{M2}$ guided to the power meters are mathematically expressed by $$P_{M1} = P_0[\tfrac{1}{2} \cdot \alpha_1 \cdot \alpha_{f1} \cdot \alpha_1 \cdot \tfrac{1}{2}) + (\tfrac{1}{2} \cdot \alpha_2 \cdot \alpha_{f2} \cdot \alpha_2 \cdot \tfrac{1}{2})]$$

$$P_{M2} = P_0[\tfrac{1}{2} \cdot \alpha_2 \cdot \alpha_{f2} \cdot \alpha_1 \cdot \tfrac{1}{2}) + (\tfrac{1}{2} \cdot \alpha_1 \cdot \alpha_{f1} \cdot \alpha_2 \cdot \tfrac{1}{2})]$$

The reflected powers $P_{M1}$ and $P_{M2}$ may also be expressed in terms of dB $$P_{M1} = -10 \cdot \log 10\{P_0[\tfrac{1}{2} \cdot \alpha_1 \cdot \alpha_{f1} \cdot \alpha_1 \cdot \tfrac{1}{2}) + (\tfrac{1}{2} \cdot \alpha_2 \cdot \alpha_{f2} \cdot \alpha_2 \cdot \tfrac{1}{2})]\}$$

$$P_{M2} = -10 \cdot \log 10\{P_0[\tfrac{1}{2} \cdot \alpha_2 \cdot \alpha_{f2} \cdot \alpha_1 \cdot \tfrac{1}{2}) + (\tfrac{1}{2} \cdot \alpha_1 \cdot \alpha_{f1} \cdot \alpha_2 \cdot \tfrac{1}{2})]\}$$

It is assumed that the power attenuation ratios $\alpha_1$ and $\alpha_2$ are expressed by the following formulae, which represent the quantities of physical elongations. The results of the calculations of the formulae are graphically represented in FIG. 4. In the calculations, $\alpha_{f1} = \alpha_{f2} = 10^{-14/10} = 0.03981$.

$$\alpha_1 = \cos^2(x)$$

$$\alpha_2 = 1 - \cos^2(x)$$

Figure 4:
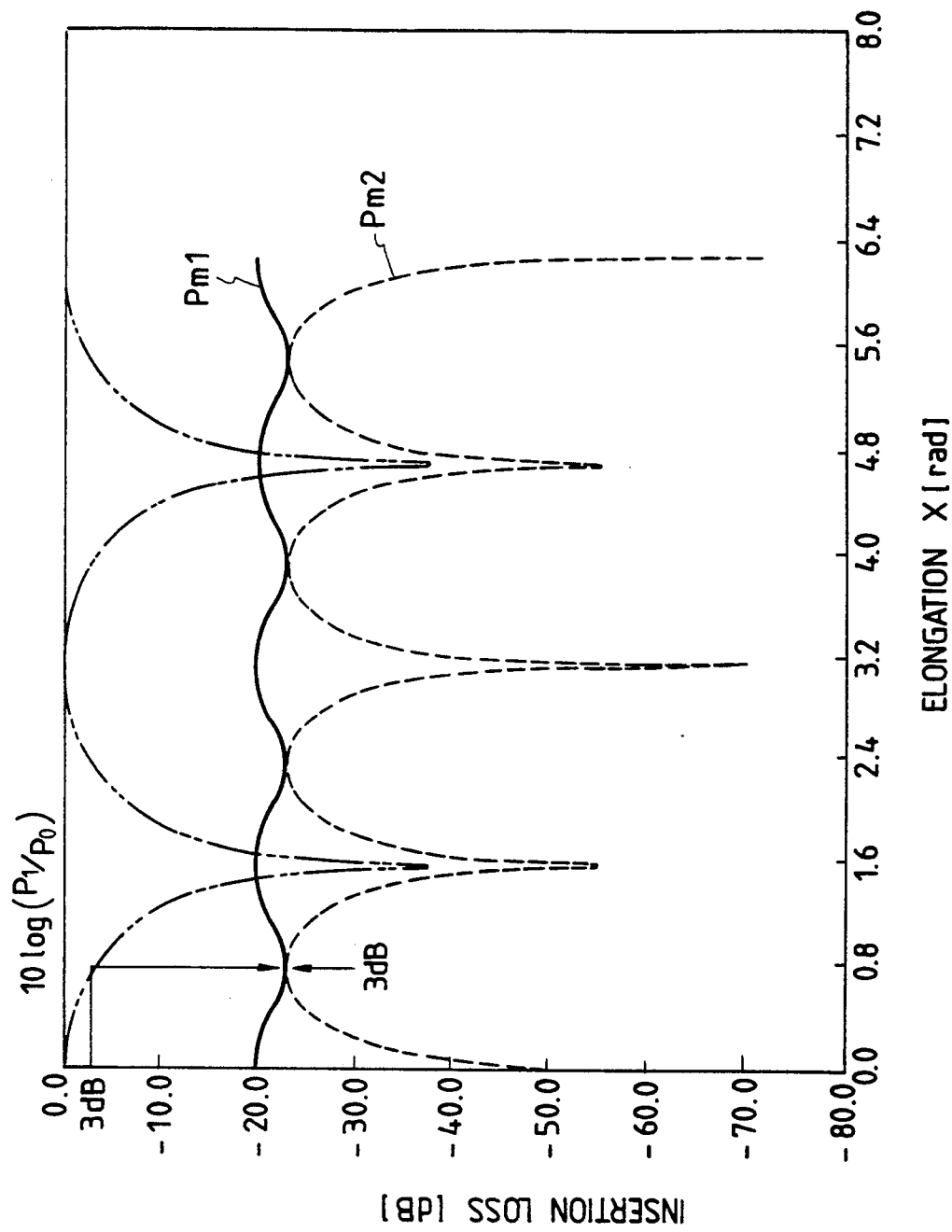
FIG. 4 is a graph showing theoretical variations of coupler insertion loss detected by power meters.

As seen from FIG. 4, in fabricating the coupler 2 having the splitting ratio of 1:1, when the insertion loss of the coupler 2 reaches 3 dB, the reflected power of the first optical fiber changes from $-20$ dB to $-23$ dB, and the reflected power of the second optical fiber changes from $-\infty$ dB to $-23$ dB. At this time, if the heating/elongating process is stopped, the coupler having a splitting ratio of 1:1 can be fabricated.

In FIG. 1, reference numeral 13 designates a power source for the semiconductor laser device 3 and the like; and 14, an isolator. The isolator 14 is used for preventing the laser device 3 from becoming instable by the light returned by the Fresnel reflection. The optical switches 6, 8a and 8b are controlled by a switch controller 15.

A coupler fabricating process by the fabricating apparatus thus far described will be described in detail with reference to FIGS. 1 and 5.

To start, the semiconductor laser device 3 is turned on (step 121). The optical switch 6 is operated to connect the movable contact 0 to the fixed contact 1 (0→1), which connects to the first optical fiber 1a (step 122). The first optical switch 8a is operated to connect the movable contact 0 to the fixed contact 2 (0→2) to guide the incident light from the first split coupler 7a to the first power meter 9a (step 123). The split light is detected by the first power meter 9a (step 124). To catch the light returned, by reflection, from the second end of the first optical fiber 1a, the first optical switch 8a is operated to connect the movable contact 0 to the fixed contact 1 (0→1) to guide the reflected light from the first split coupler 7a to the first power meter 9a (step 125). The split light is detected by the first power meter 9a (step 126). Through the sequence of operation steps, the quantity of the reflected light passing through the first optical fiber 1a is measured in the elongation controller 10.

Then, the optical switch 6 is operated to switch the path from the first optical fiber 1a to the second optical fiber 1b (0→2) (step 127). The second optical switch 8b is switched to form an optical path (0→2) for guiding the incident light from the second split coupler 7b to the second power meter 9b (step 128). The split light is detected by the second power meter 9b (step 129) To catch the light returned, by reflection, from the second end of the second optical fiber 1b, the second optical switch 8b is operated to connect the movable contact 0 to the fixed contact 1 (0→1) to guide the reflected light from the second split coupler 7b to the second power meter 9b (step 130). The split light is detected by the second power meter 9b (step 131).

Through the sequence of operations steps, the quantity of the reflected light passing through the second optical fiber 1b is measured in the elongation controller 10.

At this stage, the elongation controller 10 calculates the reflected powers $\alpha_{f1}$ and $\alpha_{f2}$ using a quantity of the reflected light of the first optical fiber 1a and a quantity of the reflected light of the second optical fiber 1b (step 132). After the values as reference values are thus calculated, the operation enters the process to fuse and elongate the coupler forming part 5. In the fusion-elongation process, the coatings on the parts of the gathered optical fibers are removed to form a coupler forming part 5 (step 133). The respective ends of the coupler forming part 5 are fixed to a pair of elongating tables 12 and 12 (step 134). Subsequently, the light-source optical switch 6 is turned to the first optical fiber 1a side (0→1) (step 135). Under this condition, the heater 11 heats the coupler forming part 5 to fuse (step 136) and the tables operate to elongate (step 137) the coupler forming part 5. Controller 10 calculates the reflected powers $P_{M1}$ and $P_{M2}$ (step 138), and stops the heating operation of the heater when $P_{M1} = P_{M2}$ (step 139), to form the coupler 2 having a splitting ratio of 1:1. The coupler 2 thus fabricated is molded in or bonded to a protecting member (not shown), such as a case of quartz (step 141).

Repeating the sequence of the operation steps, a number of couplers 2 are fabricated from the couple of long optical fibers 1a and 1b. In fabricating the first coupler, the semiconductor laser device 3 and the first and second photodetectors 4a and 4b must be connected to the first and second optical fibers 1a and 1b. However, such connection work is not required for the second and subsequent couplers fabrications.

The method to detect the reflected light for controlling the elongating process may have several variations. Some typical methods will be described with reference to FIG. 6.

Figure 6A:
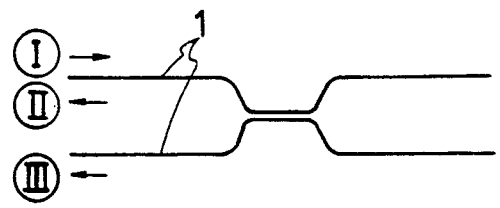
FIGS. 6(a) and 6(b) show diagrams for explaining the methods of detecting the reflecting light.

In the case of two optical fibers 1 and 1 as shown in FIG. 6(a) where incident light (I) and reflected light (II) and (III) are present, a predetermined splitting ratio can be determined by detecting at least the combinations (I) and (II), (II) and (III), and (I) and (III).

Figure 6B:
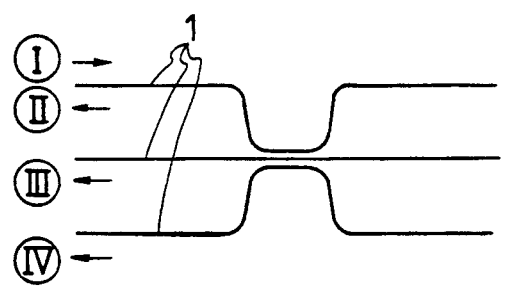

In the case of three optical fibers 1, 1 and 1 as shown in FIG. 6(b) where incident light (I) and reflected light (II), (III) and (IV) are present, a predetermined splitting ratio can be determined by detecting at least the combinations (I) and (II), (I) and (III), (I) and (IV), (II) and (III), (II) and (IV), and (III) and (IV). As a matter of course, it is preferable to detect and compare (II), (III) and (IV). The basic idea of the above methods is available for a case where more than three optical fibers.

Figure 7:
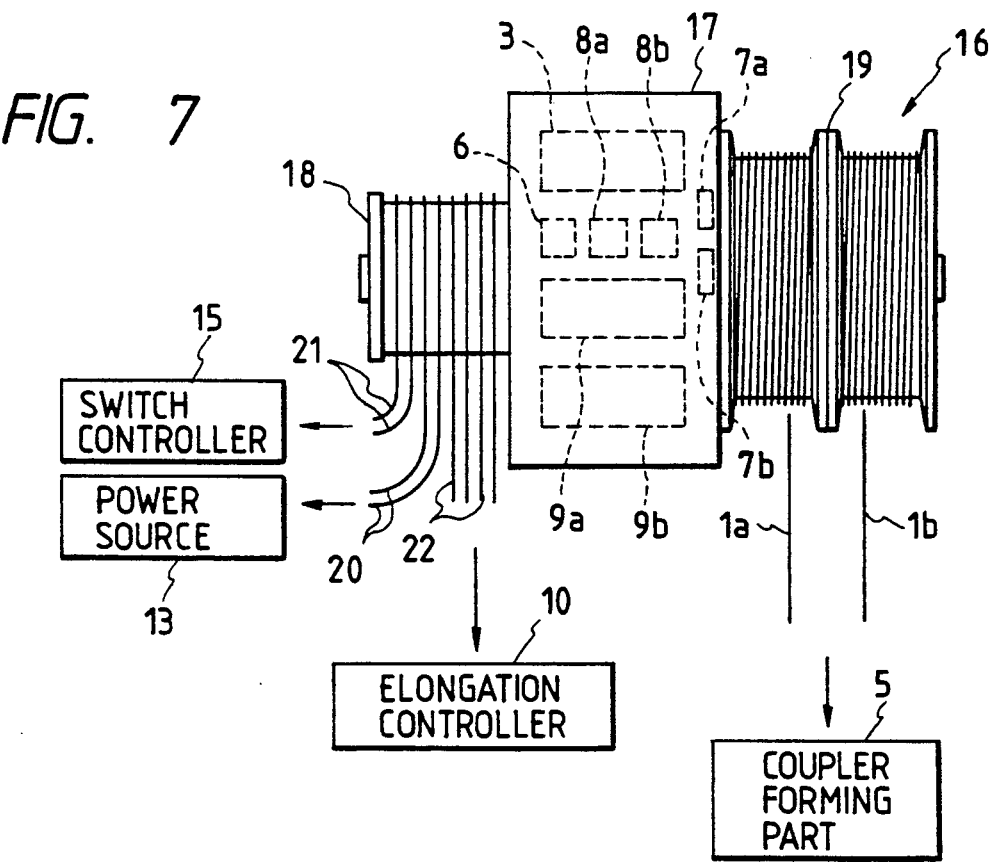
FIG. 7 is a block and schematic diagram showing a measuring unit constituting a part of the coupler fabricating apparatus.

Of those components of the coupler fabricating apparatus, the components in the range from the semiconductor laser device 3, and the first and second photodetectors 4a and 4b to the components located preceding to the coupler forming part 5 of the optical fibers 1 are constructed as a measuring unit 16 as shown in FIG. 7.

The measuring unit 16 follows. As shown, a main body 17 of the measuring unit is provided with a slip ring 18 on one side thereof, and with a couple of bobbins 19 on the other side. The main body 17 contains the semiconductor laser device 3, first and second power meters 9a and 9b, various types of switches 6, 8a, and 8b, and the like. Power cords 20, optical switch signal cords 21, and signal cords 22 connecting to the power meters 9a and 9b are wound around the slip ring 18. The first and second optical fibers 1a and 1b are wound around the bobbins 19, respectively.

A number of couplers 2 having the splitting ratio of 1:1 were fabricated by using the fiber type coupler fabricating apparatus thus constructed. The splitting ratios of the couplers were measured for examining a deviation of the ratios. In the measurement, single mode optical fibers for optical communications of 1.3 μm-band were used for the optical fibers 1, and the optical switches 6, 8a, 8b were those of the prism type having the reproducibility within ±0.02 dB.

The measurement results were as follows:

| ρ0 | 1 | 2 | 3 | 4 | 5 | 6 | 7 | 8 | 9 | 10 | x | σn-1 |
|---|---|---|---|---|---|---|---|---|---|---|---|---|
| Splitting ratio | 43.5 | 47.3 | 49.4 | 49.5 | 48.2 | 47.5 | 49.8 | 50.1 | 52.3 | 49.3 | 48.7 | 2.31 |

As seen from the measuring results, the standard deviation of the dispersion of splitting ratios is 2.31%, relatively greater than that of the conventional fabricating method. However, this figure did not create any problem in practical use. Time to fabricate one coupler by the fabricating method of the present invention was 15 minutes shorter than that (about 40 minutes) by the conventional one.

While in the present invention, a 3-dB coupler was used for splitting the incident light and the reflected light, any other type of coupler, if it can split light, may be used in place of the former.

Figure 8:
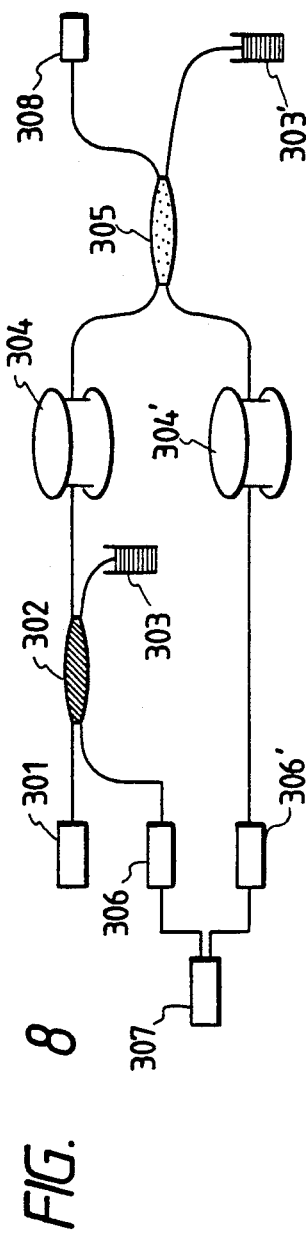
FIG. 8 is an explanatory diagram for explaining a coupler fabricating method based on the reflection monitor method, which is a specific example of the present invention.
Figure 9:
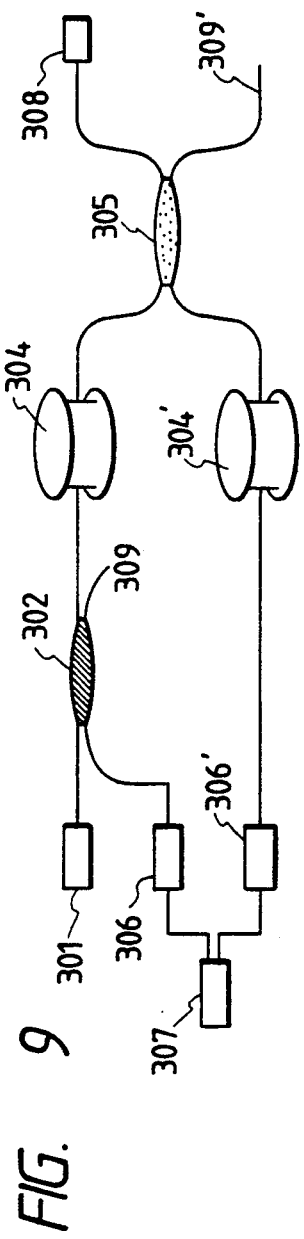
FIG. 9 is an explanatory diagram for explaining a coupler fabricating method based on a conventional reflection monitor method.

A third embodiment of the present invention will now be described with respect to FIGS. 8 and 9. To confirm the advantageous effects by a third embodiment of the present invention, stabilities of the light powers received by the photodetectors 306 and 306' were measured and compared in the two measuring systems, the conventional reflection monitor measuring system shown in FIG. 9, and the reflection monitor measuring system of the invention shown in FIG. 8. The light source 301 was an LD light source capable of generating light of 0.85 μm in wavelength. The optical fiber coupler 302 for measurement was a single mode coupler operable in the wavelength band of 0.85 μm. The fibers 304 and 304' wound around the bobbins were single mode optical fibers of a 0.85 μm band. In the reflection monitor measuring system, an optical fiber coupler having the splitting ratio of 50% was fabricated. The quantities of light received by the photodetectors 306 and 306' were measured in a state that a portion of the fiber 304 near its distal end is being vibrated. The results of the measurements were: in the conventional reflection method, the quantity of light received by the photodetector 306 varied within the range of −37.6 to −44.6 dBm, and that by the photodetector 306' varied within the range of −34.3 to 41.7 dBm. In the method of the invention, the quantity of light received by the photodetector 306 little varied at −38.0 dBm, and that by the photodetector 306' little varied at −35.0 dBm. Variations of the splitting ratio were obtained using the measurement results by the photodetectors 306 and 306'. In the conventional reflection monitor method, the splitting ratio greatly varied within the range from 23% to 76%, while in the reflection monitor method of the invention, it little varied-because the quantities of the received light were stable.

Figure 10:
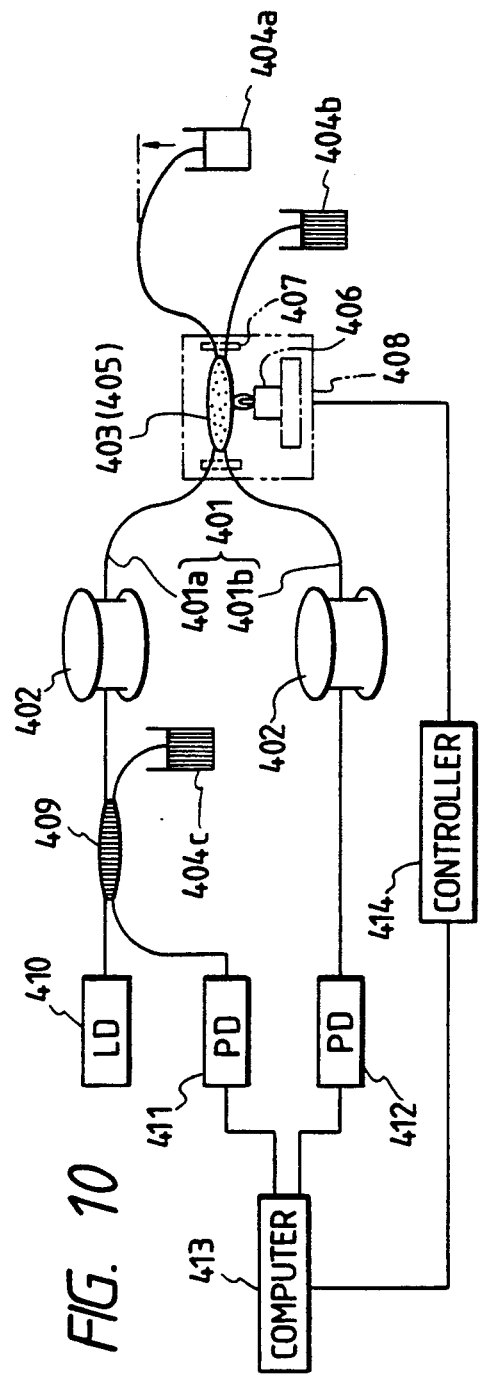
FIG. 10 is an explanatory diagram showing an outline of an optical fiber coupler fabricating apparatus by which a method of fabricating optical fiber couplers of the invention is executed.

An apparatus for fabricating optical fiber couplers by which a coupler fabricating method of a fourth embodiment of the present invention is executed, will first be described with reference to FIG. 10. In the fabricating apparatus, a couple of long single-mode optical fibers 401, which are wound around bobbins 402, are used. A number of optical fiber couplers 403 having the splitting ratio of 1:1 (50%) are successively formed while the fibers are pulled out of the bobbins. In this embodiment, the two fibers, which are exactly the same, are used. For ease of explanation, the optical fiber located above in the drawing is called a first optical fiber and denoted as 401a, and the fiber located below is called a second optical fiber and denoted as 401b. The first ends of the fibers 401a and 401b are coupled with various devices for monitoring the splitting ratio of the optical fiber couplers 403 to be formed and for controlling the coupler forming operation. The second ends of the fibers are immersed in refractive index matching oil pots 404a and 404b for preventing the Fresnel reflection. The second or other end of the second optical fiber 401b is always immersed in the refractive index matching oil pot 404b. The second end of the first optical fiber 1a is immersed in the refractive index matching oil pot 404a and pulled out of the oil pot in the fabricating process to be given later. It is immersed in the oil pot when the Fresnel reflection is suppressed at the second end of the first optical fiber 401a, and it is pulled out of the oil pot when the Fresnel reflection is actively performed there. A coupler forming part 405 is formed in a location of the optical fibers 401a and 401b, where is closer to the refractive index matching oil pots 404a and 404b. The coupler forming part 405 is formed in such a way that the coatings of the portions of the fibers 401a and 401b where the coupler forming part is to be formed, are removed, and the fibers are gathered there. A coupler is formed by heating and fusing the thus formed coupler forming part by a suitable heating means, such as a burner, and elongating it. To this end, the coupler forming part 405 is set to an elongation jig 408 including a burner 406 and elongation tables 407.

The first end of the first optical fiber 401a is connected through a measuring coupler 409 to a light source 410, such as a superluminescent diode. A fixed quantity of light is emitted from the light source 410 and is led into the fiber 401a from the first end thereof, through the measuring coupler 409. As for the split of the coupler 409 on the first optical fiber 401a side, the first end of the coupler is connected to the first optical fiber 401a, and the second end is put in a refractive index matching oil pot 404c to prevent reflection of light at the second end. As for the split of the coupler on the monitor devices side, the first end of the coupler is connected to the light source 410, and the second end is connected to a first photodetector 411. The first end of the second optical fiber 401b is connected to a second photodetector 412. Those photodetectors are constructed with optoelectric transducing elements in this embodiment, and are connected to a computer 413 for computing splitting ratios.

Light reflected at the second end of the first optical fiber 401a is split in the coupler forming part 405 into light going to the first optical fiber 401a and light going into the second optical fiber 401b. The reflected light passes through the first optical fiber 401a and is further split to enter the first photodetector 411 where it is detected. The reflected lights passes through the second optical fiber 401b and enters the second photodetector 412 where it is detected. The first photodetector 411 detects two types of reflected light; one is the reflected light containing only Rayleigh scattering light and the other is the reflected light containing Rayleigh scattering light and Fresnel reflection light. To detect the former, the second end of the first optical fiber 401a is immersed in a refractive index matching oil pot 404a, to suppress the Fresnel reflection light. To detect the latter, the second end is pulled out of the pot 404a and actively Fresnel reflects the incoming light.

The detect values by the first and second detectors 411 and 412 are input to the computer 413 for splitting ratio calculation. The computer calculates a splitting ratio by using a formula to be given later. When the calculated value reaches a predetermined splitting ratio (50% in this embodiment), the computer outputs a control signal to stop the elongating operation of the elongation controller 414 coupled with the computer.

The elongation controller 414, which is coupled with the elongation jig 408, drives the jig 408 in response to the control signal from the computer 413. The jig 408 is provided with the burner 406 for heating the coupler forming part 405 and the elongation tables 407. With the jig, the coupler forming part 405 is heated, fused, and elongated. When receiving a stop control signal from the computer 413, the elongation controller 414 stops the operation of the jig 408 with the control signal.

The principles of the monitor method will be described in brief. Assuming that a light power detected by the first photodetector 411 before the optical fiber coupler is fabricated is $P_0$, and light powers detected by the first and second photodetectors 411 and 412 when the coupler is being fabricated are $P_1$ and $P_2$, a splitting ratio (defined by a ratio of the light powers in the branch line) of the optical fiber coupler 403, that is computed by the computer 413 during the coupler fabricating process, is expressed by $$\text{Splitting ratio} = (s/(t+s)) \times 100 \ (\%)$$

where $t = (P_1/P_0)^{\frac{1}{2}}$, $s = (\alpha_1/\alpha_2) S_0 (P_2{}^2/P_0 P_1)^{\frac{1}{2}}$.

In the above formula, $\alpha 1$ and $\alpha 2$ are transmittances (emitting light power/incident light power) of the first and second optical fibers 401a and 401b, and So is the transmittance of the branch line (branch line emitting light power/main line incident light power of the measuring coupler 409). The calculations by the computer 413 are performed using the formulae as just mentioned. When a desired splitting ratio is reached, the computer outputs a signal to stop the elongating operation of the coupler forming part. Actually, the light powers P0, P1, and P2 are corrected using the detected values of the Rayleigh scattering light in the process to be given hereinafter, in a subtraction manner.

Figure 11:
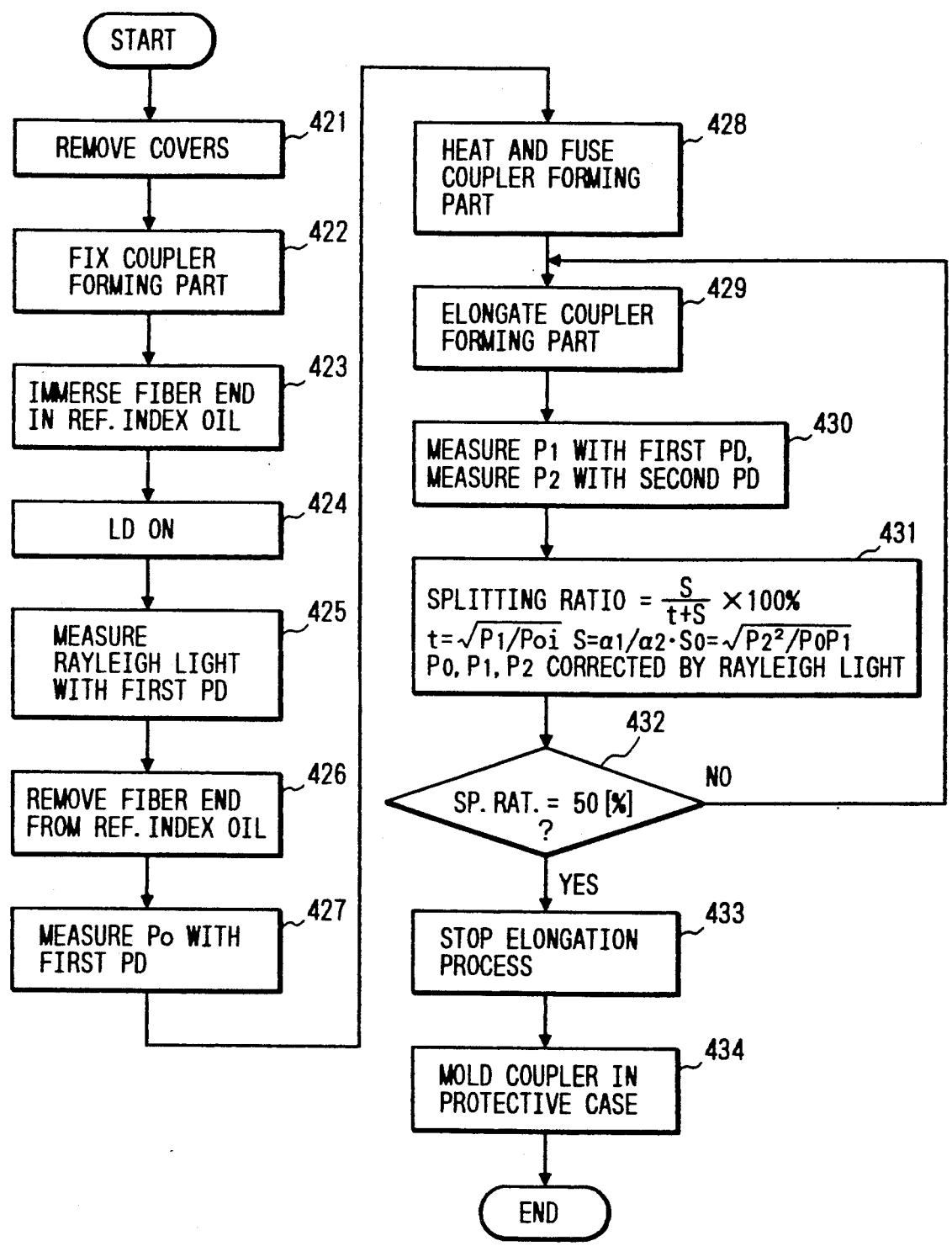
FIG. 11 is a flowchart showing a sequence of steps for fabricating an optical fiber coupler by the fabricating method of the invention.

A sequence of coupler fabricating steps will be descried with reference to a flowchart shown in FIG. 11. To start with, the coatings of the optical fibers 401 are partially removed to form a coupler forming part 5 (step 421). Both ends of the coupler forming part 405 are fixed to the elongation tables 407 and 407 of the jig 408 (step 422). Subsequently, the second end of the first optical fiber 401a is immersed in the refractive index matching oil pot 404a (step 423), and the light source 410 is turned on (step 424). Rayleigh scattering light present in the first optical fiber 401a is detected by the first photodetector 411 (step 425). The second end of the first optical fiber 401a is pulled out of the pot 404a (step 426), to be rendered ready for the Fresnel reflection. Then, the reflected light P0 is detected by the first photodetector 411 (step 427). Afterwards, in this state, the coupler forming part 405 is heated and fused by the burner 406 (step 428), and elongated (step 429). During the elongating process, the light powers P1 and P2 are detected by the first and second detectors 411 and 412 (step 430). The detected values are input to the computer 413. The computer computes a splitting ratio using those light power values (P0, P1, and P2), and the detected value of the Rayleigh scattering light for correcting the former (step 431). The detecting operation of the light powers P1 and P2 in the elongating process and the calculation of the splitting ratio are repeated till the splitting ratio reaches 50% (step 432). When 50% is reached, the computer 413 outputs a stop signal to the elongation controller 414. In response to the stop signal, the elongation controller 414 stops the elongating operation of the jig 408 (step 433). The optical fiber coupler 403 thus formed is molded in or bonded to a protecting member (not shown), such as a case made of quartz (step 434).

A number of optical fiber couplers 403 are successively formed from the two long optical fibers 401a and 401b wound around the bobbins 402, by repeating the above sequence of fabricating steps. It is noted that the measuring coupler 409 and the second photodetector 412 are coupled with the first and second optical fibers 401a and 401b only when the first optical fiber coupler 403 is fabricated, and the coupling work may be omitted for fabricating the second and subsequent ones.

Optical fiber couplers 403 were fabricated by the fabricating method of the embodiment as mentioned above, and the splitting ratios of them were measured. The light source 410 was a superluminescent diode of 0.85 μm in wavelength. The first and second optical fibers 401a and 401b were single mode fibers of 1 km long and the 0.85 μm band. The coupler 409 was also a single mode coupler of the 0.85 μm band.

Figure 12:
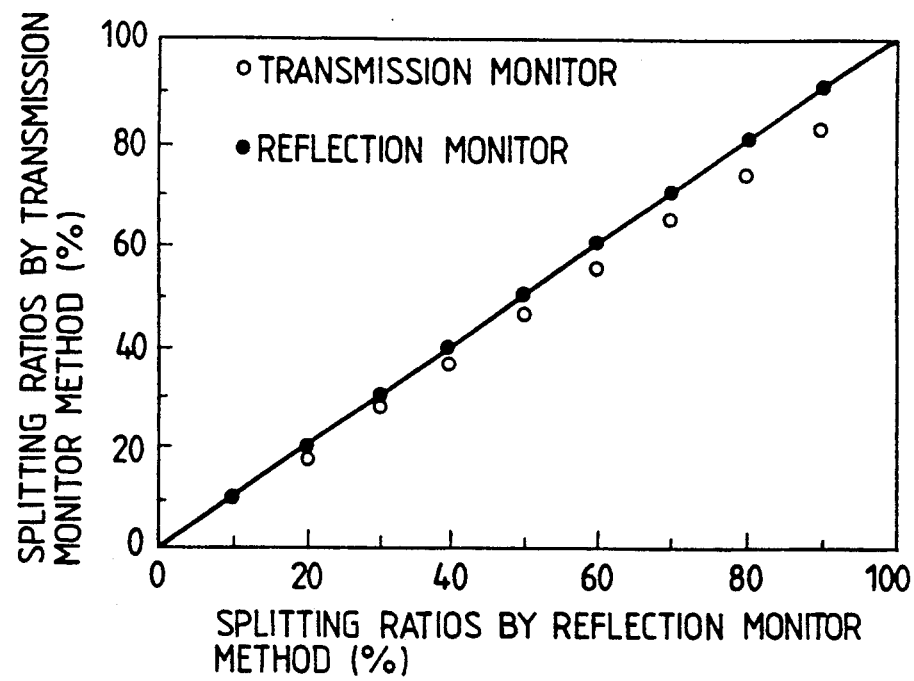
FIG. 12 is a graphical representation of splitting ratios of optical fiber couplers fabricated by the fabricating method of the invention and those of optical fibers fabricated by the conventional method.
Figure 13:
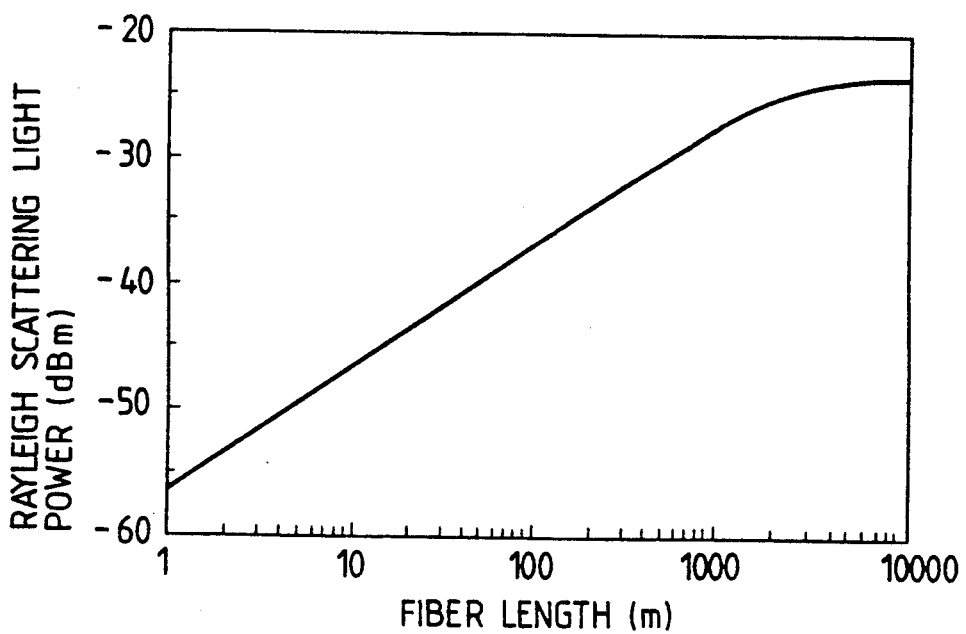
FIG. 13 is a graph of a relationship of Rayleigh scattering light power vs. fiber length.

Under the aforementioned conditions, optical fiber coupler of different splitting ratios were fabricated while monitoring the splitting ratios. Splitting ratios of the fabricated optical fiber couplers were measured by the transmission monitor method. The results of the measurement were plotted in FIG. 12. In the figure, black dots indicate the splitting ratios of the optical fiber couplers fabricated by the method of the invention, and white dots indicate the splitting ratios of the couplers fabricated by the conventional reflection monitor method. As seen from the graph, the measurement results of the reflection monitor method of the present embodiment is perfectly coincident with those of the transmission monitor method, and accordingly the optical fiber couplers having the exact splitting ratio were fabricated by the reflection monitor method of the present embodiment. The measurement results of the conventional reflection monitor method are not coincident with those of the conventional transmission monitor method. Therefore, the splitting ratio of the optical fiber couplers fabricated by the conventional reflection monitor method is somewhat inexact. From the above facts, the reflection monitor method of the present embodiment succeeded in removing the influence by the Rayleigh scattering light.

Figure 14:
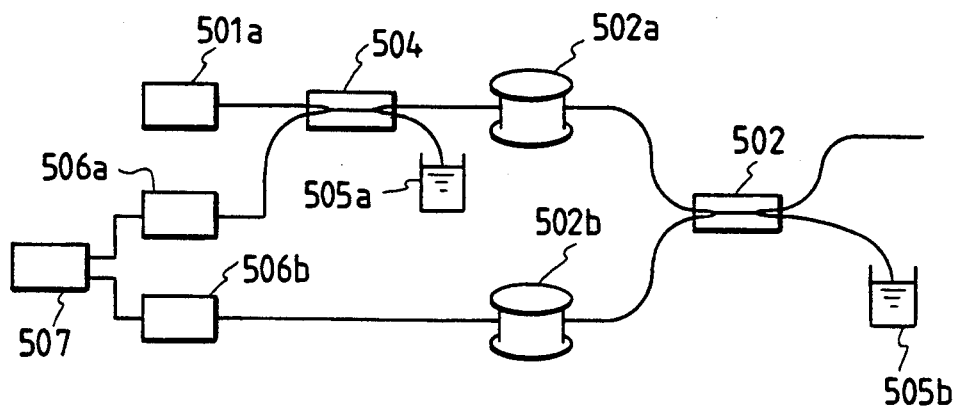
FIG. 14 is an explanatory diagram showing an outline of an optical measuring system for explaining a method for fabricating optical fiber couplers according to an embodiment of the present invention.

FIG. 14 is an explanatory diagram showing an outline of an optical measuring system for explaining a method for fabricating optical fiber couplers according to a fifth embodiment of the present invention. In the figure, like or equivalent portions are designated by like reference numerals in FIG. 15, for simplicity of explanation. In the figure, reference numeral 501a designates an SLD (superluminescent diode) light source of the low coherence type. The principles of measuring the splitting ratio are as described with reference to FIG. 15. In the present embodiment, an SLD of the low coherency type is used for the light source. Accordingly, the measurement is free from the influence by the interference and the light power variation, and hence an exact measurement is ensured. In the case of FIG. 14, the SLD is used for the light source in order to gain low coherency light, but any other suitable means may be used for the same purposes.

Figure 15:
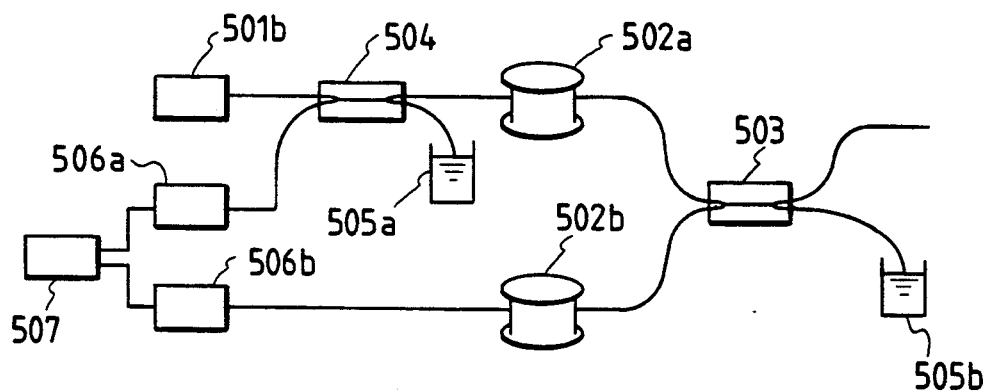
FIG. 15 is an explanatory diagram showing an outline of a reflection monitor method of prior art.

To confirm the advantageous effects by the present invention, the light power stability of the photodetectors 506a and 506b were measured and compared by using the conventional reflection monitor measuring system shown in FIG. 15 and the reflection monitor measuring system of the invention shown in FIG. 14. The light source in the reflection monitor measuring system of the invention shown in FIG. 14 was an SLD of 0.85 μm in wavelength. The light source in the conventional reflection monitor measuring system of FIG. 15 was an LD of 0.85 μm in wavelength.

Optical fiber couplers under fabrication 503 in the two measuring systems were 0.85 μm-band single-mode couplers. The bobbin-wound optical fibers 502a and 502b were also 0.85 μm-band single-mode fibers of 5 km long. Optical fiber couplers of 50% in splitting ratio were fabricated in the two measuring systems. The received light powers were measured by the photodetectors 506a and 506b under the condition that a vibration is caused between the bobbin-wound optical fiber 502a and the optical fiber coupler 503 for measurement. The results of the measurements were as tabulated in FIG. 18. As seen from the table, the received light powers measured by the photodetectors 506a and 506b are stable in the measuring system of the invention, while those are varied within the ranges in the conventional measuring system.

Variation in the splitting ratio was calculated using the measurement results of the photodetectors 506a and 506b shown in FIG. 18. In the conventional monitor method, the splitting ratio was varied in the range between 46% and 53%. In the monitor method of the invention, no variation of the splitting ratio was confirmed, since the received light power was stable.

Figure 16:
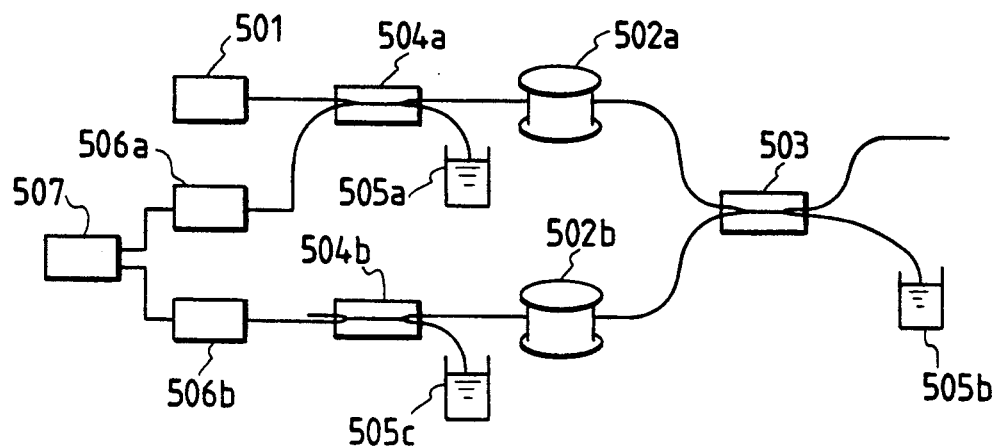
FIG. 16 is an explanatory diagram showing an outline of another reflection monitor method.
Figure 17:
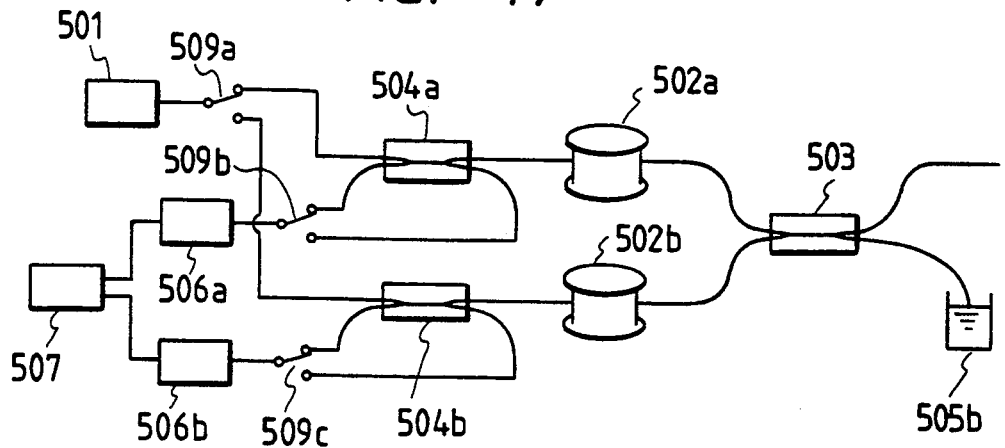
FIG. 17 is an explanatory diagram showing an outline of yet another reflection monitor method.

The embodiment of FIG. 14 is constructed by applying the present invention to the reflection monitor measuring system as described with reference to FIG. 15. It is evident that the present invention may be applied to other reflection monitor measuring systems including those shown in FIGS. 16 and 17.

Figure 19:
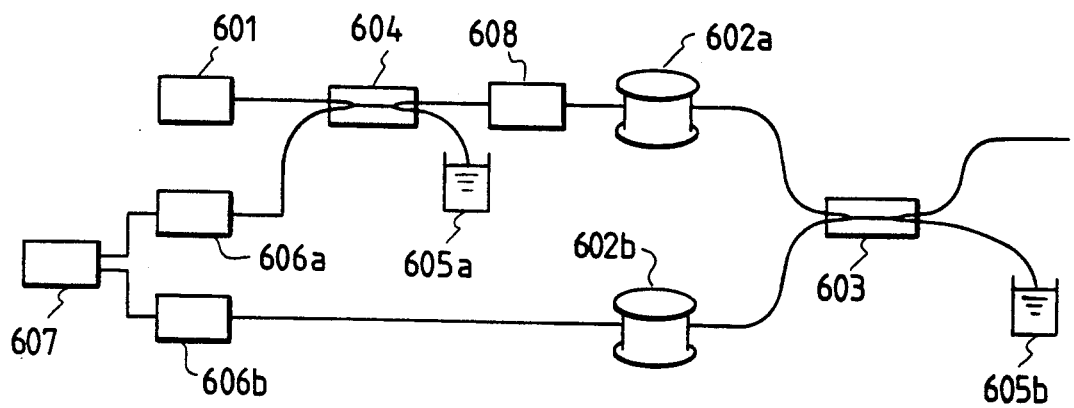
FIG. 19 is an explanatory diagram showing an outline of an optical measuring system for explaining a method for fabricating optical fiber couplers according to an embodiment of the present invention.

FIG. 19 is an explanatory diagram showing an outline of an optical measuring system for explaining a method for fabricating optical fiber couplers according to a sixth embodiment of the present invention. In the figure, like or equivalent portions are designated by like reference numerals in FIG. 20, for simplicity for explanation. In the figure, reference numeral 608 designates a polarization/phase modulator utilizing a piezo-electric element. The principles of measuring the splitting ratio is as described with reference to FIG. 20. In the present embodiment, the polarization/phase modulator 608 is inserted between the light source 601 and the optical fiber coupler 603. Since the interference light power is varied at high speed by the polarization/phase modulator 608, the averaged and stabilized light powers are measured by the photodetectors 606a and 606b, and consequently an accurate measurement is realized.

In the sixth embodiment of FIG. 19, the polarization/phase modulator utilizing the piezo-electric element is used as the means to vary the interference light power. It may be replaced by another means which is capable of varying at least one of the phase, polarization, and frequency of light. Further, the polarization/phase modulator may be placed at any other position than the insertion position shown in FIG. 19, if it lies in the route from the light source 601 to the photodetectors 606a and 606b.

Figure 20:
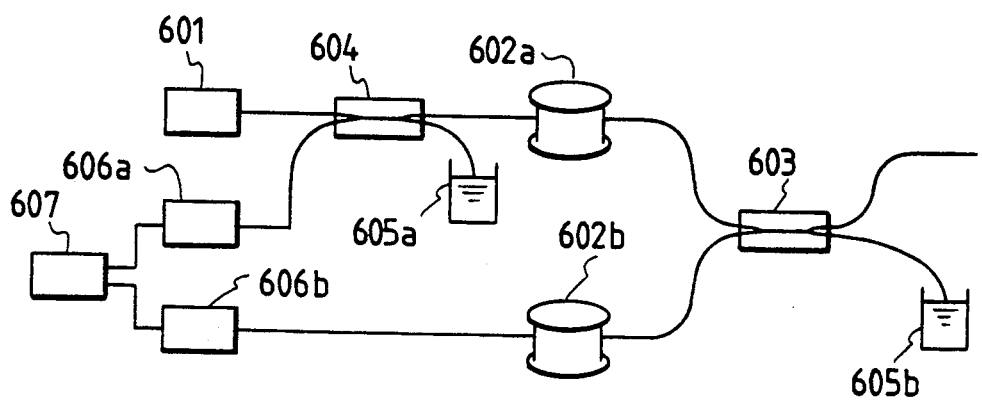
FIG. 20 is an explanatory diagram showing an outline of a reflection monitor method.

To confirm the advantageous effects by the present invention, the light power stability of the photodetectors 606a and 606b were measured and compared by using the conventional reflection monitor measuring system shown in FIG. 20 and the reflection monitor measuring system of the invention shown in FIG. 19. An LD of 0.85 μm in wavelength was used for the light source in the reflection monitor measuring system of the invention shown in FIG. 19 and in the conventional reflection monitor measuring system of FIG. 20.

Optical fiber couplers under fabrication 603 in the two measuring systems were 0.85 μm-band single-mode couplers. The bobbin-wound optical fibers 602a and 602b were also 0.85 μm-band single-mode fibers of 5 km long. The polarization/phase modulator 608 was constructed with a tubular piezo-electric element that is wound with a 0.85 μm-band single mode optical fiber. Optical fiber couplers of 50% in splitting ratio were fabricated in the two measuring systems. The received light powers were measured by the photodetectors 606a and 606b under the condition that a vibration is caused between the bobbin-wound optical fiber 602a and the optical fiber coupler 603 for measurement. The results of the measurements were as tabulated in FIG. 23. As seen from the table, the received light powers measured by the photodetectors 606a and 606b are stable in the measuring system of the invention, while those are varied within the ranges in the conventional measuring system.

Variation in the splitting ratio was calculated using the measurement results of the photodetectors 606a and 606b shown in FIG. 23. In the conventional monitor method, the splitting ratio was varied in the range between 46% and 53%. In the monitor method of the invention, no variation of the splitting ratio was confirmed, since the received light power was stable.

Figure 21:
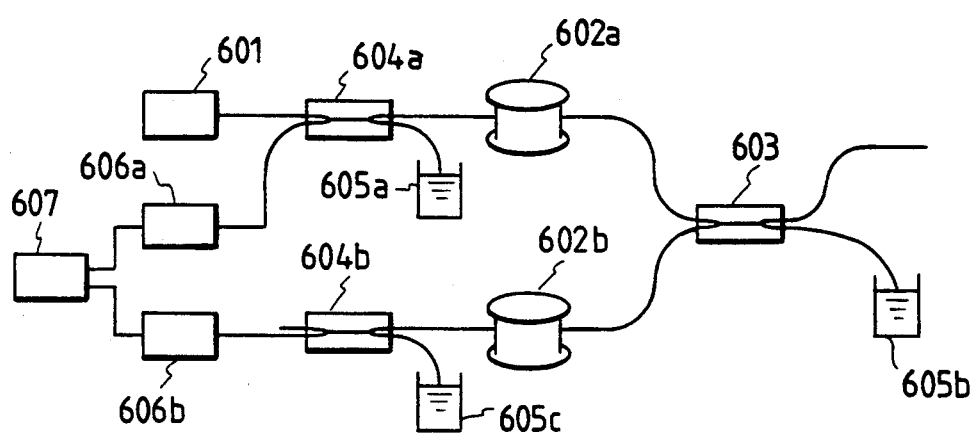
FIG. 21 is an explanatory diagram showing an outline of another reflection monitor method.
Figure 22:
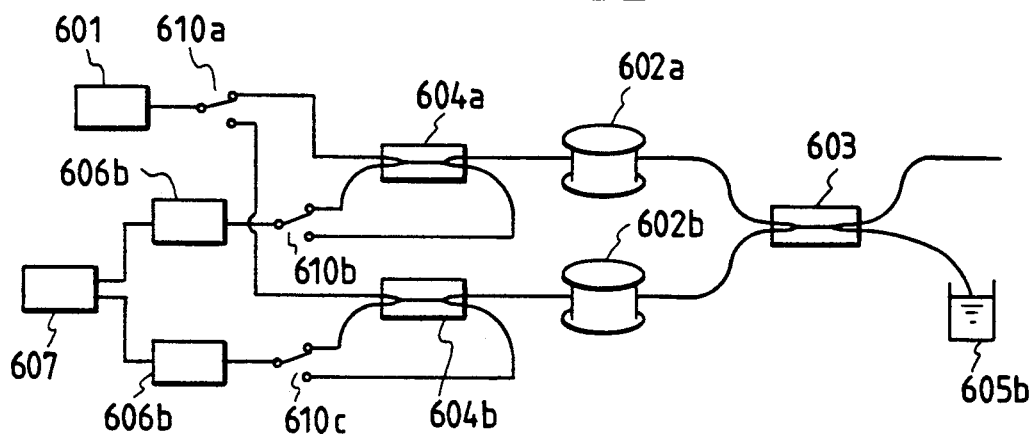
FIG. 22 is an explanatory diagram showing an outline of yet another reflection monitor method.

The embodiment of FIG. 19 is constructed by applying the present invention to the reflection monitor measuring system as described with reference to FIG. 20. It is evident that the present invention may be applied to other reflection monitor measuring systems including those shown in FIGS. 21 and 22.

Figure 24:
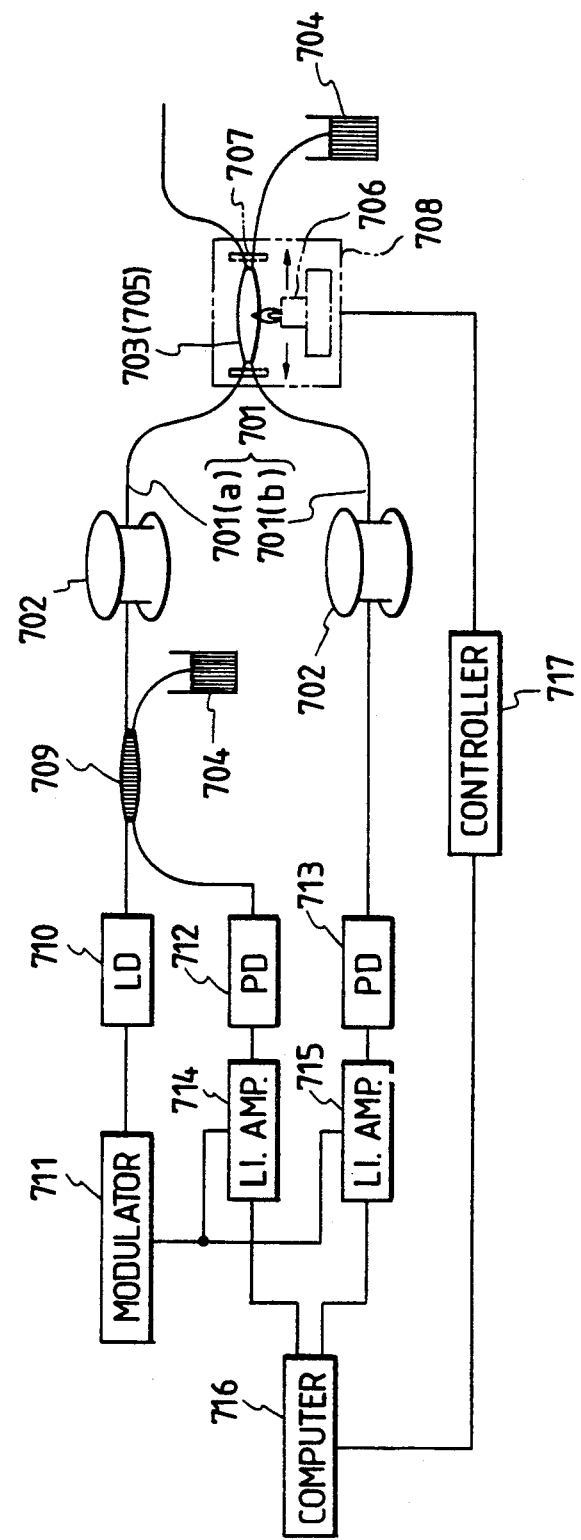
FIG. 24 is an explanatory diagram showing an outline of an optical fiber fabricating apparatus by which a method of fabricating optical fiber couplers of the invention is executed.

An apparatus for fabricating optical fiber couplers by which a coupler fabricating method according to a seventh embodiment of the present invention is executed, will first be described with reference to FIG. 24. In the fabricating apparatus, a couple of long single-mode optical fibers 701, which are wound around bobbins 702, are used. A number of optical fiber couplers 703 having the splitting ratio of 1:1 (50%) are successively formed while the fibers are pulled out of the bobbins. In this embodiment, the two fibers, which are exactly the same, are used. For ease of explanation, the optical fiber located above in the drawing is called a first optical fiber and denoted as 701a, and the fiber located below is called a second optical fiber and denoted as 701b. The first ends of the fibers 701a and 701b are coupled with various devices for monitoring the splitting ratio of the optical fiber couplers 703 to be fabricated and for controlling the coupler forming operation. The second ends of the fibers are open. The open end of the first optical fiber 701a is merely opened, but the open end of the second optical fiber 701b is immersed in refractive index matching oil pots 704. A coupler forming part 705 of the first and second optical fibers 701a and 701b is formed in a location of the optical fibers 701a and 701b, where is closer to the refractive index matching oil pots 704. The coupler forming part 705 is formed in such a way that the coatings of the portions of the fibers 701a and 701b where the coupler forming part is to be formed, are removed, and the fibers are closely combined there. A coupler is formed by heating and fusing the thus formed coupler forming part by a suitable heating means, such as a burner, and elongating it. To this end, the coupler forming part 705 is set to an elongating jig 708 including a burner 706 and elongation tables 707.

The first or one end of the first optical fiber 701a is connected through a measuring coupler 709 to a modulated-light source 710, such as a semiconductor laser device. A modulating signal source 711 is located upstream of the light source 710 and connected to the same. The modulated light source 710, constructed with a semiconductor laser, emits a modulated light (pulse light) of high frequency in response to a signal from the modulating signal source 711. That is, a desired pulse light is generated from the light source 711 by the modulating signal from the modulating signal source 711 and is led into the fiber 701a from the first end thereof, through the measuring coupler 709. As for the split of the coupler 709 on the first optical fiber 701a side, the first end of the coupler is connected to the first optical fiber 701a, and the second end is immersed in a refractive index matching oil pot 704 to prevent reflection of light at the second end. As for the split of the coupler 709 on the monitor devices side, the first end of the coupler is connected to the light source 710, and the second end is connected to a first photodetector 712. The first end of the second optical fiber 701b is connected to a second photodetector 713. Those photodetectors 712 and 713 are constructed with optoelectric transducing elements for converting the reflected light guided thereto into electric signals. More specifically, the reflected light from the second end of the first optical fiber 701a passes through the coupler forming part 705 where it is split. The split light is guided to the first and second optical fibers 701a and 701b. The split reflected light passes through the first optical fiber 701a, is further split by the measuring coupler 709, and led to the first photodetector 712 where it is detected. The split reflected light, after passing through the second optical fiber 701b, is guided to the second photodetector 713 where it is detected.

A first lock-in amplifier 714 is connected to the first photodetector 712 located upstream of the amplifier. A second lock-in amplifier 715 is connected to the second photodetector 713 located upstream of the amplifier. Those amplifiers 714 and 715 are coupled with a computer 716 for calculating splitting ratios, and function to amplify the Fresnel reflection light component of the reflected light. Further, the amplifiers 714 and 715 are coupled with the modulating signal source 711, and operate in synchronism with a signal from the modulating signal source 711. That is, the amplifiers pick up the modulated light, which were applied from the light source 710 to the optical fiber 701, from the reflected light detected by the photodetectors 712 and 713, and amplify the modulated light. Thus, the amplifiers amplify the Fresnel reflection light in the detected light which also contain Rayleigh scattering light, so that the Rayleigh scattering light is lowered relative to the Fresnel reflection light, thereby to reduce the influence by the Rayleigh scattering light. The computer 716 calculates a splitting ratio on the basis of the quantities of the reflected light amplified by the lock-in amplifiers 714 and 715, by-using a formula to be given later. When the calculated value reaches a predetermined splitting ratio (50% in this embodiment), the computer outputs a control signal to stop the elongating operation of the elongation controller 714 coupled with the computer.

The elongation controller 717, which is coupled with the elongation jig 708, drives the jig 708 in response to the control signal from the computer 716. The jig 708 is provided with the burner 706 for heating the coupler forming part 705 and the elongation tables 707. With the jig, the coupler forming part 705 is heated, fused, and elongated. When receiving a stop control signal from the computer 716, the elongation controller 717 stops the elongating operation of the jig 708 with the control signal.

The principles of the monitor method will be described in brief. Assuming that a light power detected by the first photodetector 712 before the optical fiber coupler is fabricated is $P_0$, and light powers detected by the first and second photodetectors 712 and 713 when the coupler is being fabricated are $P_1$ and $P_2$, a splitting ratio (defined by a ratio of the light powers in the branch line) of the optical fiber coupler 703, that is computed by the computer 716 during the coupler fabricating process, is expressed by $$Splitting\ ratio = (s/(t+s)) \times 100\ (\%)$$

where $T = (P_1/R_0)^{\frac{1}{2}}$, $s = (\alpha_1/\alpha_2)S_0(P_2^2/P_0P_1)^{\frac{1}{2}}$.

In the above formula, $\alpha 1$ and $\alpha 2$ are transmittances (emitting light power/incident light power) of the first and second optical fibers 701a and 701b, and $S_0$ is the transmittance of the branch line (branch line emitting light power/main line incident light power). The calculations by the computer 716 are performed using the formulae as just mentioned. When a desired splitting ratio is reached, the computer outputs a signal to stop the elongating operation of the coupler forming part. Actually, the light powers P0, P1, and P2 are the values amplified by the first and second lock-in amplifiers 714 and 715.

Figure 25:
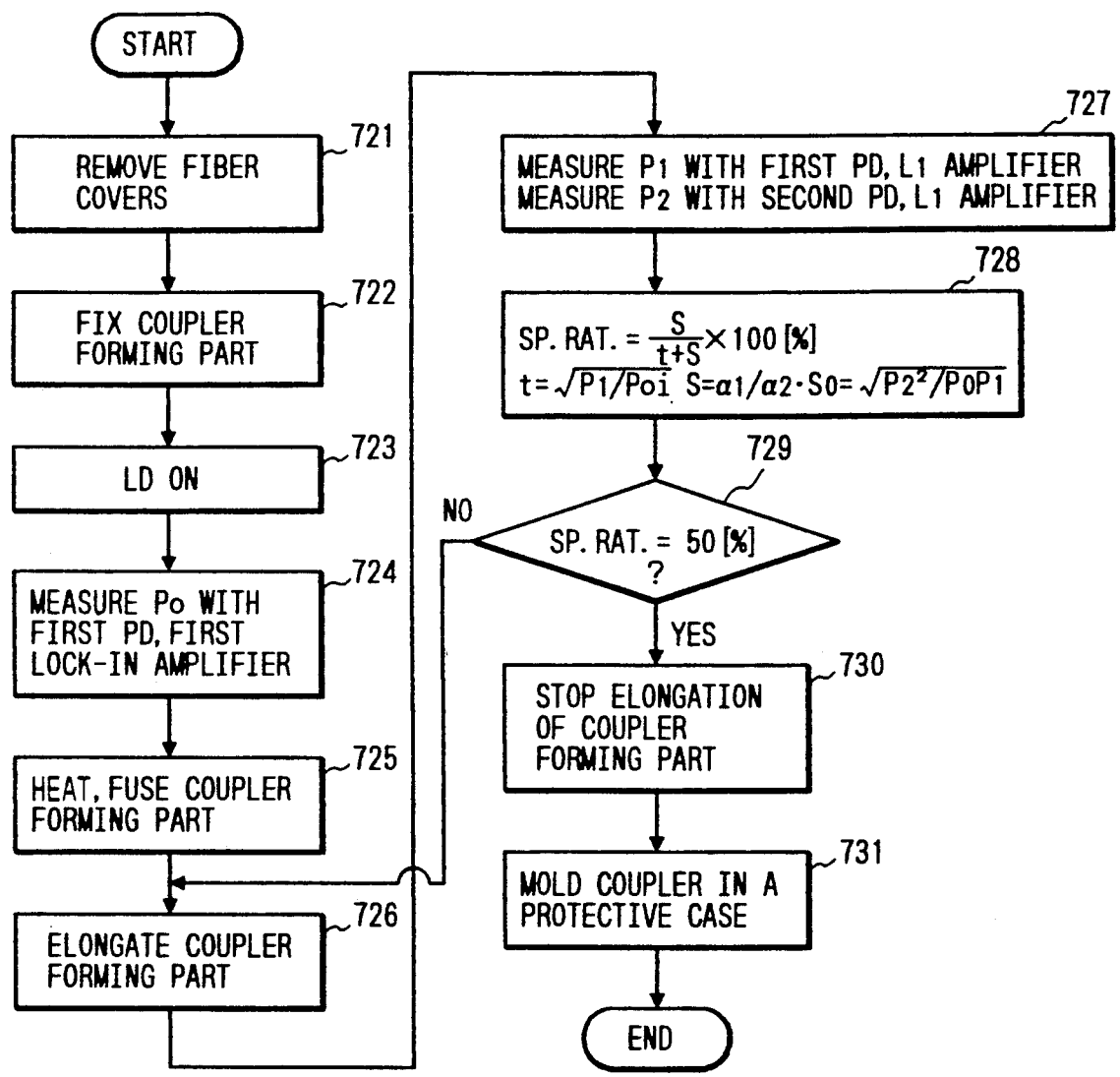
FIG. 25 is a flowchart showing a sequence of steps for fabricating a optical fiber coupler by the fabricating method of the invention.

A sequence of coupler fabricating steps will be descried with reference to a flowchart shown in FIG. 25. To start with, the coatings of the optical fibers 701 are partially removed to form a coupler forming part 705 (step 721). Both ends of the coupler forming part 705 are fixed to the elongation tables 707 and 707 of the jig 708 (step 722). Subsequently, the modulated-light source 710 is turned on (step 723). The reflected light P0 returned from the second end of the first optical fiber 701a is detected by the first photodetector 711 (step 724). Afterwards, in this state, the coupler forming part 705 is heated and fused by the burner 706 (step 725), and elongated (step 726). During the elongating process, the light powers P1 and P2 are detected by the first and second detectors 712 and 713 (step 727). The detected values are input to the computer 716. The computer computes a splitting ratio using those light power values (step 728). The detecting operation of the light powers P1 and P2 in the elongating process and the calculation of the splitting ratio are repeated till the splitting ratio reaches 50% (step 729). When 50% is reached, the computer 716 outputs a stop signal to the elongation controller 717. In response to the stop signal, the elongation controller 717 stops the elongating operation of the jig 708 (step 730). The optical fiber coupler 703 thus formed is molded in or bonded to a protecting member (not shown), such as a case made of quartz (step 731).

A number of optical fiber couplers 703 are successively formed from the two long optical fibers 701a and 701b wound around the bobbins 702, by repeating the above sequence of fabricating steps. It is noted that the measuring coupler 709 and the second photodetector 713 are coupled with the first and second optical fibers 701a and 701b only when the first optical fiber coupler 703 is fabricated, and the coupling work may be omitted for fabricating the second and subsequent ones.

Optical fiber couplers 703 were fabricated by the fabricating method of the embodiment as mentioned above, and the splitting ratios of them were measured. The light source 710 was a superluminescent diode of 0.85 μm in wavelength. A rectangular wave, modulating signal at 200 kHz is applied to the light source 710, from the modulating signal source 711. In response to the signal, the light source 710 generates rectangular wave, pulse light at 200 kHz. The first and second optical fibers 701a and 701b were single mode fibers of 1 km long and the 0.85 μm band. The measuring coupler 709 was also a single mode coupler of the 0.85 μm band.

Figure 26:
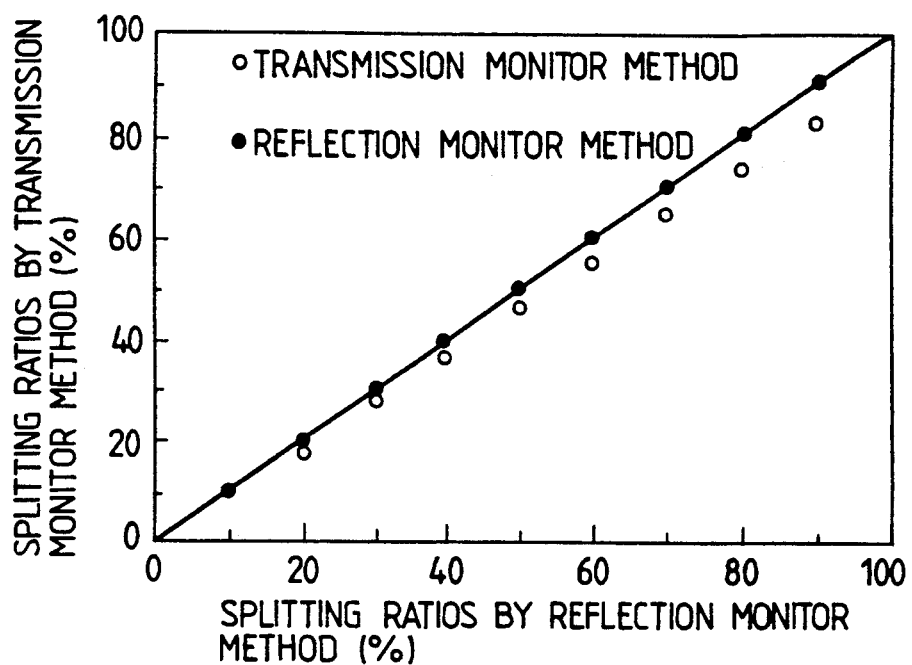
FIG. 26 is a graphical representation of splitting ratios of optical fiber couplers fabricated by the fabricating method of the invention and those of optical fibers fabricated by the conventional method.
Figure 27:
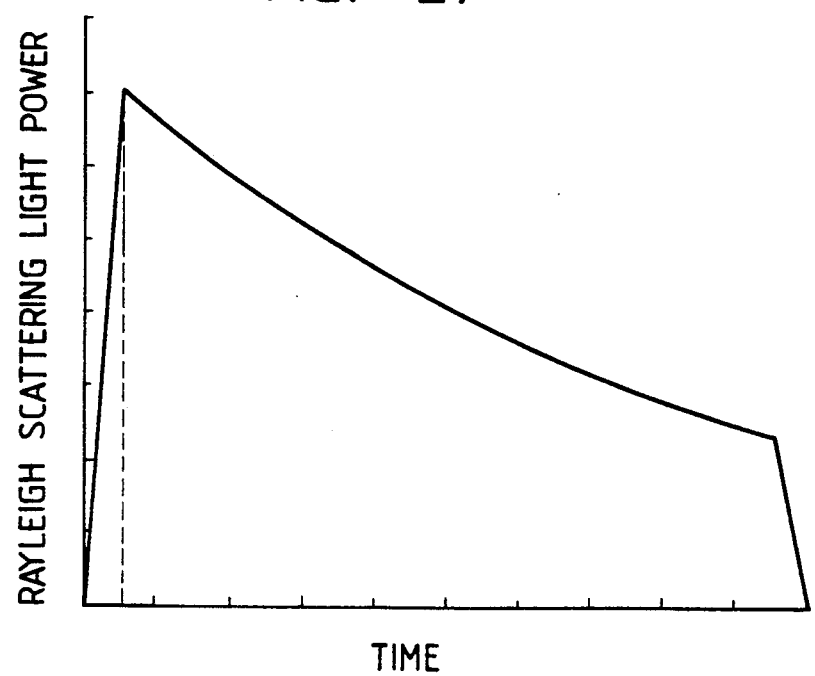
FIG. 27 is a graph showing the characteristic of Rayleigh scattering light for pulse light.
Figure 28:
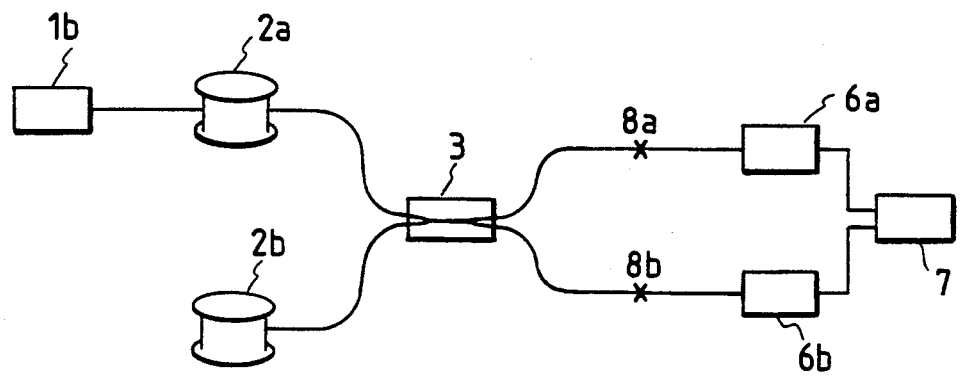
FIG. 28 is an explanatory diagram showing an outline of the transmission monitor method.
Figure 29:
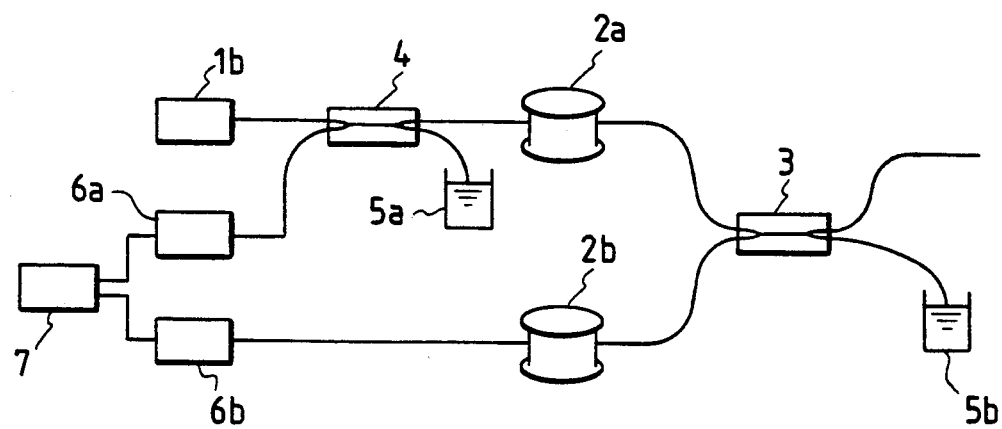
FIG. 29 is an explanatory diagram showing an outline of the reflection monitor method.

Under the aforementioned conditions, optical fibers of different splitting ratios were fabricated while monitoring the splitting ratios. Splitting ratios of the fabricated optical fiber couplers were measured by the transmission monitor method. The results of the measurement were plotted in FIG. 26. In the figure, black dots indicate the splitting ratios of the optical fiber couplers fabricated by the method of the invention, and white dots indicate the splitting ratios of the couplers fabricated by the conventional reflection monitor method. As seen from graph, the measurement results of the reflection monitor method of the present embodiment is perfectly coincident with those of the transmission monitor method, and accordingly the optical fiber couplers having the exact splitting ratio were fabricated by the reflection monitor method of the present embodiment. The measurement results of the conventional reflection monitor method are not coincident with those of the conventional transmission monitor method. Therefore, the splitting ratio of the optical fiber couplers fabricated by the conventional reflection monitor method is somewhat inexact. From the above facts, the reflection monitor method of the present embodiment succeeded in removing the influence by the Rayleigh scattering light.

What is claimed is:

1. A method of fabricating an optical fiber coupler comprising the steps of:

fusing and elongating a coupler forming part of a plurality of optical fibers;

providing a predetermined quantity of light incident on at least one of said plurality of optical fibers from a first end of said optical fibers;

passing said light through said coupler forming part;

reflecting said light at a second end of said optical fiber;

returning said light through said coupler forming part toward the first end of said optical fiber;

detecting said light at the first end of said optical fibers;

obtaining a ratio of a characteristic of the detected light to a characteristic of the incident light; and inhibiting said fusing and elongating step responsive to said ratio.

2. A method of fabricating an optical fiber coupler according to claim 1, wherein the length of said fibers is substantially greater than the diameter thereof, further comprising the steps of:

providing a light source and photodetectors at the first end of the optical fibers; and forming a coupler forming part at the second end of the optical fibers.

3. A method of fabricating an optical fiber coupler comprising the steps of:

fusing and elongating a coupler forming part of a plurality of optical fibers;

introducing a predetermined quantity of light into at least one of said plurality of optical fibers from a first end of said optical fibers;

passing said light through said coupler forming part;

reflecting said passed light at a second end of said optical fiber;;

returning said light through said coupler forming part toward the first end of said optical fiber;

detecting said returned light at a first end of each of at least two of said fibers;

obtaining a ratio of a characteristic of the light detected at a first of said at least two fibers to a characteristic of the light detected at a second of at least two fibers; and inhibiting said fusing and elongating step responsive to said ratio.

4. A method of fabricating an optical fiber coupler according to claim 3, wherein the length of said fibers is substantially greater than the diameter thereof, further comprising the steps of:
   providing a light source and photodetectors at the first end of the optical fibers; and
   forming a coupler forming part at the second end of the optical fibers.

5. A method of fabricating an optical fiber coupler according to one of claims 1-4, said obtaining step comprising the step of correcting said ratio.

6. A method of fabricating an optical fiber coupler according to claim 5, wherein said correcting step comprises the step of:
   correcting said ratio responsive to a characteristic of said reflection ends.

7. A method of fabricating an optical fiber coupler according to claim 6, further comprising the steps of:
   applying a predetermined quantity of light to at least one of said optical fibers at a first end thereof; and
   determining the quantity of Rayleigh scattering light in said optical fiber at the first end thereof.

8. A method of fabricating an optical fiber coupler according to claim 7, further comprising the step of:
   suppressing Fresnel reflection at a second end of said optical fiber responsive to said determining step.

9. A method of fabricating an optical fiber coupler according to claim 8, further comprising the step of:
   immersing the second end of said optical fiber in refractive index matching material, thereby suppressing the Fresnel reflection at the second end of said optical fiber.

10. A method of fabricating an optical fiber coupler according to claim 6, further comprising the step of:
    providing a reflection preventing device on the second end of at least one of the plurality of optical fibers.

11. A method of fabricating an optical fiber coupler according to claim 10, further comprising the step of:
    providing reflection preventing devices on the second end of all optical fibers other than the fiber to which light is incident.

12. A method of fabricating an optical fiber coupler according to claim 11, further comprising the step of:
    forming a reflection preventing device by immersing the second end of an optical fiber in light absorbing material.

13. A method of fabricating an optical fiber coupler according to claim 11, further comprising the step of:
    forming a reflection preventing device by immersing the second end of an optical fiber in refractive index matching oil.

14. A method of fabricating an optical fiber coupler according to claim 11, further comprising the step of:
    forming a reflection preventing device by bending the second end of an optical fiber so that its diameter is reduced, thereby causing light loss.

15. A method of fabricating an optical fiber coupler according to claim 11, further comprising the step of:
    forming a reflection preventing device by obliquely cutting the second end of an optical fiber.

16. A method of fabricating an optical fiber coupler according to claim 11, further comprising the step of:
    forming a reflection preventing device by obliquely polishing the second end of an optical fiber.

17. A method of fabricating an optical fiber coupler according to claim 10, further comprising the step of:
    forming a reflection preventing device by immersing the second end of an optical fiber in light absorbing material.

18. A method of fabricating an optical fiber coupler according to claim 10, further comprising the step of:
    forming a reflection preventing device by immersing the second end of an optical fiber in refractive index matching oil.

19. A method of fabricating an optical fiber coupler according to claim 10, further comprising the step of:
    forming a reflection preventing device by bending the second end of an optical fiber so that its diameter is reduced, thereby causing light loss.

20. A method of fabricating an optical fiber coupler according to claim 10, further comprising the step of:
    forming a reflection preventing device by obliquely cutting the second end of an optical fiber.

21. A method of fabricating an optical fiber coupler according to claim 10, further comprising the step of:
    forming a reflection preventing device by obliquely polishing the second end of an optical fiber.

22. A method of fabricating an optical fiber coupler according to claim 6, wherein said correcting step comprises the step of:
    correcting said ratio responsive to a characteristic of said incident light.

23. A method of fabricating an optical fiber coupler according to claim 22, further comprising the step of:
    introducing low coherency light into the first end of said optical fiber.

24. A method of fabricating an optical fiber coupler according to claim 22, further comprising the steps of:
    forcibly causing the variations of the received light powers owing to the interferences by the Fresnel reflection light and the Rayleigh scattering light; and
    averaging said variations with respect to time, whereby light is received stably.

25. A method of fabricating an optical fiber coupler according to claim 24, further comprising the steps of:
    varying at least one of the phase, polarization, and frequency of the light propagating through the optical fiber and the optical fiber coupler, thereby forcibly causing the variations of the received light powers owing to the interferences by the Fresnel reflection light and the Rayleigh scattering light.

26. A method of fabricating an optical fiber coupler according to claim 22, further comprising the step of:
    introducing modulated light into the first end of said optical fiber.

27. A method of fabricating an optical fiber coupler according to claim 26, further comprising the step of:
    detecting the reflected light synchronously with the incident modulated light.

28. A method of fabricating an optical fiber coupler according to claim 27, further comprising the step of:
    amplifying the reflected light prior to said detecting step.

29. A method of fabricating an optical fiber coupler according to claim 28, further comprising the step of:
    using a lock-in amplifier in said amplifying step.

30. A method of fabricating an optical fiber coupler according to claim 5, wherein said correcting step comprises the step of:
    correcting said ratio responsive to a characteristic of said incident light.

31. A method of fabricating an optical fiber coupler according to claim 30, further comprising the step of:

introducing low coherency light into the first end of said optical fiber.

32. A method of fabricating an optical fiber coupler according to claim 30, further comprising the steps of:
forcibly causing the variations of the received light powers owing to the interferences by the Fresnel reflection light and the Rayleigh scattering light; and
averaging said variations with respect to time, whereby light is received stably.

33. A method of fabricating an optical fiber coupler according to claim 32, further comprising the steps of:
varying at least one of the phase, polarization, and frequency of the light propagating through the optical fiber and the optical fiber coupler, thereby forcibly causing the variations of the received light powers owing to the interferences by the Fresnel reflection light and the Rayleigh scattering light.

34. A method of fabricating an optical fiber coupler according to claim 30, further comprising the step of:
introducing modulated light into the first end of said optical fiber.

35. A method of fabricating an optical fiber coupler according to claim 34, further comprising the step of:
detecting the reflected light synchronously with the incident modulated light.

36. A method of fabricating an optical fiber coupler according to claim 35, further comprising the step of:
amplifying the reflected light prior to said detecting step.

37. A method of fabricating an optical fiber coupler according to claim 36, further comprising the step of:
using a lock-in amplifier in said amplifying step.

38. A method of fabricating an optical fiber coupler according to claim 30, wherein said correcting step comprises the step of:
correcting said ratio responsive to a characteristic of said reflection ends.

39. A method of fabricating an optical fiber coupler according to claim 38, further comprising the steps of:
applying a predetermined quantity of light to at least one of said optical fibers-at a first end thereof; and
determining the quantity of Rayleigh scattering light in said optical fiber at the first end thereof.

40. A method of fabricating an optical fiber coupler according to claim 39, further comprising the step of:
suppressing Fresnel reflection at a second end of said optical fiber responsive to said determining step.

41. A method of fabricating an optical fiber coupler according to claim 40, further comprising the step of:
immersing the second end of said optical fiber in refractive index matching material, thereby suppressing the Fresnel reflection at the second end of said optical fiber.

42. A method of fabricating an optical fiber coupler according to claim 38, further comprising the step of:
providing a reflection preventing device on the second end of at least one of the plurality of optical fibers.

43. A method of fabricating an optical fiber coupler according to claim 42, further comprising the step of:
providing reflection preventing devices on the second end of all optical fibers other than the fiber to which light is incident.

44. A method of fabricating an optical fiber coupler according to claim 43, further comprising the step of:
forming a reflection preventing device by immersing the second end of an optical fiber in light absorbing material.

45. A method of fabricating an optical fiber coupler according to claim 43, further comprising the step of:
forming a reflection preventing device by immersing the second end of an optical fiber in refractive index matching oil.

46. A method of fabricating an optical fiber coupler according to claim 43, further comprising the step of:
forming a reflection preventing device by bending the second end of an optical fiber so that its diameter is reduced, thereby causing light loss.

47. A method of fabricating an optical fiber coupler according to claim 43, further comprising the step of:
forming a reflection preventing device by obliquely cutting the second end of an optical fiber.

48. A method of fabricating an optical fiber coupler according to claim 43, further comprising the step of:
forming a reflection preventing device by obliquely polishing the second end of an optical fiber.

49. A method of fabricating an optical fiber coupler according to claim 42, further comprising the step of:
forming a reflection preventing device by immersing the second end of an optical fiber in light absorbing material.

50. A method of fabricating an optical fiber coupler according to claim 42, further comprising the step of:
forming a reflection preventing device by immersing the second end of an optical fiber in refractive index matching oil.

51. A method of fabricating an optical fiber coupler according to claim 42, further comprising the step of:
forming a reflection preventing device by bending the second end of an optical fiber so that its diameter is reduced, thereby causing light loss.

52. A method of fabricating an optical fiber coupler according to claim 42, further comprising the step of:
forming a reflection preventing device by obliquely cutting the second end of an optical fiber.

53. A method of fabricating an optical fiber coupler according to claim 42, further comprising the step of:
forming a reflection preventing device by obliquely polishing the second end of an optical fiber.

54. A system for fabricating an optical fiber coupler comprising:
means for fusing and elongating a coupler forming part of a plurality of optical fibers;
a light source for providing a predetermined quantity of light incident on at least one of said plurality of optical fibers from a first end-of said optical fibers;
an optical fiber for passing said light through said coupler forming part and for returning said light through said coupler forming part toward the first end of said optical fiber;
means for reflecting said light at a second end of said optical fiber;
means for detecting said returned light at a first end of at least one of said fibers;
means for obtaining a ratio of a characteristic of said detected light to a characteristic of said incident light; and
means for inhibiting the operation of said fusing and elongating means responsive to said obtaining means.

55. A system for fabricating an optical fiber coupler according to claim 54, wherein the length of said optical fibers is substantially greater that the diameter thereof, further comprising:
  a light source at the first end of said optical fibers;
  photodetectors at the first end of said optical fibers; and
  means at the second end of said optical fibers for forming the coupler forming part.

56. A system for fabricating an optical fiber coupler comprising:
  means for fusing and elongating a coupler forming part of a plurality of optical fibers;
  a light source for providing a predetermined quantity of light incident on at least one of said plurality of optical fibers from a first end of said optical fibers;
  an optical fiber for passing said light through said coupler forming part and for returning said light through said coupler forming part toward the first end of said optical fiber;
  means for reflecting said light at a second end of said optical fiber;
  means for detecting said returned light at a first end of each of at least two of said fibers;
  means for obtaining a ratio of a characteristic of the light detected at a first of said at least two fibers to a characteristic of the light detected at a second of said at least two fibers; and
  means for inhibiting the operation of said fusing and elongating means responsive to said obtaining means.

57. A system for fabricating an optical fiber coupler according to claim 56, wherein the length of said optical fibers is substantially greater that the diameter thereof, further comprising:
  a light source at the first end of said optical fibers;
  photodetectors at the first end of said optical fibers; and
  means at the second end of said optical fibers for forming the coupler forming part.

58. A system for fabricating an optical fiber coupler according to any of claims 54–57, wherein said obtaining means comprises means for correcting said ratio.

59. A system for fabricating an optical fiber coupler according to claim 58, wherein said correcting means comprises:
  means for correcting said ratio responsive to a characteristic of said incident light.

60. A system for fabricating an optical fiber coupler according to claim 59, further comprising:
  means for applying a predetermined quantity of light to at least one of said optical fibers at a first end thereof; and
  means for determining the quantity of Rayleigh scattering light in said optical fiber at the first end thereof.

61. A system for fabricating an optical fiber coupler according to claim 60, further comprising:
  means for suppressing Fresnel reflection at a second end of said optical fiber responsive to said determining means.

62. A system for fabricating an optical fiber coupler according to claim 61, wherein:
  said suppressing means is provided by immersing the second end of said optical fiber in refractive index matching material.

63. A system for fabricating an optical fiber coupler according to claim 59, further comprising:
  a reflection preventing device on the second end of at least one of the plurality of optical fibers for preventing reflections therein.

64. A system for fabricating an optical fiber coupler according to claim 63, further comprising:
  reflection preventing devices on the second end of all optical fibers other than the fiber to which light is incident for preventing reflections therein.

65. A system for fabricating an optical fiber coupler according to claim 64, wherein:
  at least one said reflection preventing devices is provided by immersing the second end of an optical fiber in light absorbing material.

66. A system for fabricating an optical fiber coupler according to claim 64, wherein:
  at least one of said reflection preventing devices is provided by immersing the second end of an optical fiber in refractive index matching oil.

67. A system for fabricating an optical fiber coupler according to claim 64, wherein:
  at least one of said reflection preventing devices is provided by bending the second end of an optical fiber so that its diameter is reduced, thereby causing light loss.

68. A system for fabricating an optical fiber coupler according to claim 64, wherein:
  at least one of said reflection preventing devices is provided by obliquely cutting the second end of an optical fiber.

69. A system for fabricating an optical fiber coupler according to claim 64, wherein:
  at least one of said reflection preventing devices is provided by obliquely polishing the second end of an optical fiber.

70. A system for fabricating an optical fiber coupler according to claim 63, wherein:
  said reflection preventing device is provided by immersing the second end of an optical fiber in light absorbing material.

71. A system for fabricating an optical fiber coupler according to claim 63, wherein:
  said reflection preventing device is provided by immersing the second end of an optical fiber in refractive index matching oil.

72. A system for fabricating an optical fiber coupler according to claim 63, wherein:
  said reflection preventing device is provided by bending the second end of an optical fiber so that its diameter is reduced, thereby causing light loss.

73. A system for fabricating an optical fiber coupler according to claim 63, wherein:
  said reflection preventing device is provided by obliquely cutting the second end of an optical fiber.

74. A system for fabricating an optical fiber coupler according to claim 63, wherein:
  said reflection preventing device is provided by obliquely polishing the second end of an optical fiber.

75. A system for fabricating an optical fiber coupler according to claim 59, wherein said correcting means comprises:
  means for correcting said ratio responsive to a characteristic of said reflected light.

76. A system for fabricating an optical fiber coupler according to claim 75, wherein said light source comprises:
  means for introducing low coherency light into the first end of said optical fiber.

77. A system for fabricating an optical fiber coupler according to claim 75, further comprising:
means for forcibly causing variations of the received light owing to interference by the Fresnel reflection light and the Rayleigh scattering light; and
means for averaging said variations with respect to time, whereby light is received stably.

78. A system for fabricating an optical fiber coupler according to claim 77, further comprising:
means for varying at least one of the phase, polarization, and frequency of the light propagating through the optical fiber and the optical fiber coupler, thereby forcibly causing variations of the received light owing to interference by Fresnel reflection light and Rayleigh scattering light.

79. A system for fabricating an optical fiber coupler according to claim 75, wherein said light source comprises:
means for introducing modulated light into the first end of said optical fiber.

80. A system for fabricating an optical fiber coupler according to claim 79, further comprising:
means for detecting the reflected light synchronously with the incident modulated light.

81. A system for fabricating an optical fiber coupler according to claim 80, further comprising:
means for amplifying the reflected light prior to detection by said detecting means.

82. A system for fabricating an optical fiber coupler according to claim 81, wherein said amplifying means comprises a lock-in amplifier.

83. A system for fabricating an optical fiber coupler according to any of claims 54–57, wherein said correcting means comprises:
means for correcting said ratio responsive to a characteristic of said reflected light.

84. A system for fabricating an optical fiber coupler according to claim 83, wherein said light source comprises:
means for introducing low coherency light into the first end of said optical fiber.

85. A system for fabricating an optical fiber coupler according to claim 83, further comprising:
means for forcibly causing variations of the received light owing to interference by the Fresnel reflection light and the Rayleigh scattering light; and
means for averaging said variations with respect to time, whereby light is received stably.

86. A system for fabricating an optical fiber coupler according to claim 85, further comprising:
means for varying at least one of the phase, polarization, and frequency of the light propagating through the optical fiber and the optical fiber coupler, thereby forcibly causing variations of the received light owing to interference by Fresnel reflection light and Rayleigh scattering light.

87. A system for fabricating an optical fiber coupler according to claim 83, wherein said light source comprises:
means for introducing modulated light into the first end of said optical fiber.

88. A system for fabricating an optical fiber coupler according to claim 87, further comprising:
means for detecting the reflected light synchronously with the incident modulated light.

89. A system for fabricating an optical fiber coupler according to claim 88, further comprising:
means for amplifying the reflected light prior to detection by said detecting means.

90. A system for fabricating an optical fiber coupler according to claim 89, wherein said amplifying means comprises a lock-in amplifier.

91. A system for fabricating an optical fiber coupler according to claim 83, wherein said correcting means comprises:
means for correcting said ratio responsive to a characteristic of said incident light.

92. A system for fabricating an optical fiber coupler according to claim 91, further comprising:
means for applying a predetermined quantity of light to at least one of said optical fibers at a first end thereof; and
means for determining the quantity of Rayleigh scattering light in said optical fiber at the first end thereof.

93. A system for fabricating an optical fiber coupler according to claim 92, further comprising:
means for suppressing Fresnel reflection at a second end of said optical fiber responsive to said determining means.

94. A system for fabricating an optical fiber coupler according to claim 93, wherein:
said suppressing means is provided by immersing the second end of said optical fiber in refractive index matching material.

95. A system for fabricating an optical fiber coupler according to claim 92, further comprising:
reflection preventing devices on the second end of all optical fibers other than the fiber to which light is incident for preventing reflections therein.

96. A system for fabricating an optical fiber coupler according to claim 95, wherein:
at least one of said reflection preventing devices is provided by immersing the second end of an optical fiber in light absorbing material.

97. A system for fabricating an optical fiber coupler according to claim 95, wherein:
at least one of said reflection preventing devices is provided by immersing the second end of an optical fiber in refractive index matching oil.

98. A system for fabricating an optical fiber coupler according to claim 95, wherein:
at least one of said reflection preventing devices is provided by bending the second end of an optical fiber so that its diameter is reduced, thereby causing light loss.

99. A system for fabricating an optical fiber coupler according to claim 95, wherein:
at least one of said reflection preventing devices is provided by obliquely cutting the second end of an optical fiber.

100. A system for fabricating an optical fiber coupler according to claim 95, wherein:
at least one of said reflection preventing devices is provided by obliquely polishing the second end of an optical fiber.

101. A system for fabricating an optical fiber coupler according to claim 91, further comprising:
a reflection preventing device on the second end of at least one of the plurality of optical fibers for preventing reflections therein.

102. A system for fabricating an optical fiber coupler according to claim 101, wherein:

said reflection preventing device is provided by immersing the second end of an optical fiber in light absorbing material.

103. A system for fabricating an optical fiber coupler according to claim 101, wherein:

said reflection preventing device is provided by immersing the second end of an optical fiber in refractive index matching oil.

104. A system for fabricating an optical fiber coupler according to claim 101, wherein:

said reflection preventing device is provided by bending the second end of an optical fiber so that its diameter is reduced, thereby causing light loss.

105. A system for fabricating an optical fiber coupler according to claim 101, wherein:

said reflection preventing device is provided by obliquely cutting the second end of an optical fiber.

106. A system for fabricating an optical fiber coupler according to claim 101, wherein:

said reflection preventing device is provided by obliquely polishing the second end of an optical fiber.

* * * * *